United States Patent [19]

Uramoto et al.

[11] Patent Number: 5,249,146
[45] Date of Patent: Sep. 28, 1993

[54] DCT/IDCT PROCESSOR AND DATA PROCESSING METHOD

[75] Inventors: Shinichi Uramoto; Yoshitsugu Inoue, both of Hyogo, Japan

[73] Assignee: Mitsubishi Denki Kabushiki Kaisha, Tokyo, Japan

[21] Appl. No.: 854,922

[22] Filed: Mar. 20, 1992

[30] Foreign Application Priority Data

Mar. 27, 1991 [JP] Japan .................................. 3-063259

[51] Int. Cl.⁵ .......................................... G06F 15/332
[52] U.S. Cl. ..................................................... 364/725
[58] Field of Search ........................... 364/725; 382/56

[56] References Cited

U.S. PATENT DOCUMENTS

| | | | |
|---|---|---|---|
| 4,791,598 | 12/1988 | Liou et al. | 364/725 |
| 4,829,465 | 5/1989 | Knauer et al. | 364/725 |
| 4,849,922 | 7/1989 | Riolfo | 364/725 |
| 5,029,122 | 7/1991 | Uetani | 364/725 |
| 5,053,985 | 10/1991 | Friedlander et al. | 364/725 |

OTHER PUBLICATIONS

"A 30 NS (600 MOPS) Image Processor with a Reconfigurable Pipeline Architecture", IEEE 1989 Custom Integrated Circuits Conference, by Kunitoshi Aono et al, 1989, pp. 24.4.1 to 24.4.4.

*Primary Examiner*—David H. Malzahn
*Attorney, Agent, or Firm*—Lowe, Price, LeBlanc & Becker

[57] ABSTRACT

A one-dimensional discrete cosine transform processor of N (N: positive integer)-term input data X includes a preprocessing section for carrying out addition and subtraction of (i)th-term data x (i) and (N−i)th-term data x (N−1) of input data X, and a unit for performing a product sum operation for sets of intermediate data subjected to preprocessing by addition and sets of intermediate data subjected to preprocessing by subtraction, respectively. The product sum operation unit includes a data rearranging unit for outputting, in parallel and in order, bit data of the same figure of a set of data, a partial sum generator for generating a partial sum by using the parallel bit data as an address, and an accumulator for accumulating outputs of the partial sum generator. A one-dimensional inverse discrete cosine transform processor of N-term input data X includes a unit for performing a product sum operation of input data, and a postprocessing section for carrying out addition and subtraction of 2-term data in a predetermined combination of an output of the product sum operation unit. The number of times of multiplication is reduced by utilizing inherent characteristics of coefficients of DCT/IDCT processing. Since the product sum operation is performed by a ROM table and an adder, a faster multiplication is realized.

48 Claims, 16 Drawing Sheets

DCT/IDCT PROCESSOR AND DATA PROCESSING METHOD

BACKGROUND OF THE INVENTION

1. Field of the Invention

The present invention relates generally to data processors and data processing methods and, more particularly, to an apparatus and method for carrying out discrete cosine transform or inverse cosine transform of data.

2. Description of the Background Art

In order to process video data at a high speed, high effective coding is carried out. In high effective coding, a data amount of a digital video signal is compressed with picture quality being maintained as high as possible. In high effective coding, a redundant component of the signal is first removed for efficient coding. For this purpose, orthogonal transform techniques are often employed. As one of the orthogonal transform techniques, discrete cosine transform DCT is provided. The DCT is implemented by a simple product sum operation using a cosine function as a coefficient. The DCT is defined by the following expression (1):

$$Y = AX \tag{1}$$

where X is an N-term column vector indicating input data, Y is an N-term column vector indicating output data, and A is N by N coefficient matrix represented by the following expression.

$$A(i, j) = \sqrt{\frac{2}{N}} \cdot C(i) \cdot \cos \frac{(2i + 1)j}{2N} \pi$$

$$C(i) \begin{cases} = \sqrt{1/2} & (i = 0) \\ = 1 & (i \neq 0) \end{cases}$$

$$i, j = 0, 1, \ldots N - 1$$

The expression (1) represents a case where input data X is of N terms. $2^m$ points are generally employed, where m is a natural number. A description will now be made on 8 point DCT where N=8 (m=3). As can be seen from the expression (1), DCT is a matrix operation, and in practice, this processing is realized by product sum operation.

FIG. 1 shows configuration of a conventional DCT processor. This DCT processor is described in, for example, *IEEE*, Proceedings of Custom Integrated Circuits Conference 89, 1989, pp. 24.4.1 to 24.4.4.

Referring to FIG. 1, the conventional DCT processor includes eight sum product operation units 100a to 100h arranged in parallel for calculating respective terms y0 to y7 of output data Y.

Each of product sum operation units 100a to 100h is of the same configuration and includes a parallel multiplier 101 for taking a product of input data xi (i=0 to 7) and a predetermined weighting coefficient, and an accumulator 102 for accumulating an output of parallel multiplier 101 to generate output data yj (j=0 to 7). Here, reference characters 101 and 102 generically denote respective components 101a to 101h and 102a to 102h. In the following description also, reference numerals having no suffixes generically denote corresponding elements.

Accumulator 102 includes a 2-input adder 103 for receiving an output of parallel multiplier 101 at its one input, and an accumulating register 104 for latching an output of adder 103. An output of register 104 is applied to an output terminal 106 and also to the other input of adder 103. Data yj of the respective terms of output data Y are sequentially output through a selector not shown from output terminal 106. An operation will now be described.

Identical data are applied through an input terminal 105 to product sum operation units 100a to 100h. The following arithmetic operation is carried in each of product sum operation units 100a-100h:

$$yj = \sum_{i=0}^{7} A(i, j) \, xi \tag{2}$$

$$= \frac{1}{2} \sum_{i=0}^{7} C(j) \cdot \left( \cos \frac{(2i + 1)}{16} j\pi \right) \cdot xi$$

$$i, j = 0, 1, \ldots 7$$

For example, data y0 of a zeroth term in an output data vector Y is calculated as follows in product sum operation unit 100a.

When receiving zeroth-term data x0 (hereinafter referred to simply as input data) in an input data vector, parallel multiplier 101a outputs a product A (0, 0)·x0 of data x0 and a coefficient A (0, 0) to adder 103a. Register 104a is being reset, and the content thereof is 0. Accordingly, product A (0, 0)·x0 is output from adder 103a and then stored in register 104a.

When input data x1 is applied, a product A (1, 0)·x1 is output from multiplier 101a. An output of adder 103a is A (0, 0)·x0 + A (1, 0)·x1 and stored in register 104a.

By repetition of such an operation, an output of accumulator 102a provided after application x7 is $$\sum_i A(i, 0) \cdot xi,$$

so that output data y0 is obtained.

Similar calculation (which differs merely in values of a weighting coefficient A (i, j)) is carried out also in the remaining product sum operation units 100b–100h, and output data y1-y7 are obtained. These output data y0-y7 are sequentially output through output terminal 106.

In contrast to the DCT operation, there is an inverse DCT operation for carrying out the inverse operation of the DCT operation. The inverse DCT (IDCT) is expressed as follows:

$$X = A'Y$$

where an input data vector X is obtained from an output data vector Y. That is, only the difference between the DCT operation and the IDCT operation is a difference between coefficients A and A'. Thus, in the configuration of FIG. 1, the IDCT operation can be carried out by changing the coefficients in parallel multipliers 101a–101h.

In other words, the DCT and the IDCT can be carried out on the same hardware. An increase in hardware is only concerned with a control circuit (not shown) for making a selection between a coefficient for DCT and that for IDCT.

The above-described one-dimensional DCT operation can be expanded to a two-dimensional DCT operation. The two-dimensional DCT operation is obtained by making both input data vector X and output data vector Y be two-dimensional vectors.

FIG. 2 shows configuration of a conventional two-dimensional DCT (or IDCT) processor. Referring to FIG. 2, the processor includes a first one-dimensional DCT processing section 111a for subjecting input data from input terminal 105 to one-dimensional DCT processing, a transposition circuit 112 for rearranging rows and columns of an output of first one-dimensional DCT processing section 111a, and a second one-dimensional DCT processing section 111b for subjecting an output of transposition circuit 112 to one-dimensional DCT processing. First one-dimensional DCT processing section 111a performs a DCT (or IDCT) operation in a row direction, and second one-dimensional DCT processing section 111b performs a DCT (or IDCT) operation in a column direction.

FIG. 3 is a diagram showing configuration of the transposition circuit of FIG. 2. Referring to FIG. 3, transposition circuit 112 includes a buffer memory 121 and an address generation circuit 122 for generating write/read addresses of buffer memory 121. Buffer memory 121 receives output data of first one-dimensional DCT processing section 111a through an input terminal 125 and sequentially stores the same therein in accordance with an address signal from address generation circuit 122. Also, buffer memory 121 applies corresponding data from an output terminal 126 to second one-dimensional DCT processing section 111b in accordance with an address signal from address generation circuit 122. An operation will now be described. Input data X and output data Y are two dimensional. the elements of which are each represented by x (i, j) and y (i, j), i, j=0, 1 . . . 7.

Input data are applied in the order of rows to first one-dimensional DCT processing section 111a. More specifically, input data are applied to input terminal 105 in the order of 8-term row vectors x (0, j), x (1, j), . . . x (7, j).

First one-dimensional DCT processing section 111a performs the DCT operation for each row vector to output intermediate data Z. At that time, first DCT processing section 111a outputs intermediate data of row vectors in the order of rows, i.e., z (0, j), z (1, j) . . . . Accordingly, a DCT operation in the row direction of input data X is carried out.

As shown in FIG. 3, transposition circuit 112 first stores the intermediate data from first DCT processing section 111a into buffer memory 121 in the order of receiving of the intermediate data (the order of rows).

Then, intermediate data Z are read in the order of columns, i.e., the order of column vectors z (i, 0), z (i, 1) . . . from buffer memory 121.

Intermediate data Z read in the order of columns are applied to second DCT processing section 111b. Second DCT processing section 111b carries out on the intermediate data one-dimensional DCT processing. Accordingly, data subjected to one-dimensional DCT processing in the column direction are output from second one-dimensional DCT processing section 111b. Output data Y from second one-dimensional DCT processing section 111b are output in the order of columns from output terminal 106. As a result, two-dimensional DCT shown by the following equation (3) is performed.

$$Yuv = \frac{1}{4} \sum_{i=0}^{7} \sum_{j=0}^{7} C(u) \cdot C(v) \cdot \cos \frac{(2i + 1) u\pi}{16} \cdot \quad (3)$$

$$\cos \frac{(2j + 1) v\pi}{16} \cdot Xij$$

$$C(u), C(v) = \begin{cases} \frac{1}{\sqrt{2}}, & (u, v = 0) \\ 1 & (u, v \neq 0) \end{cases}$$

First and second DCT processing sections 111a and 111b carry out the same processing except for coefficients in the parallel multiplying circuits. If multiplication coefficients of first and second DCT processing sections 111a and 111b are changed, two-dimensional IDCT shown by the following equation (4) is carried out.

$$Xij = \frac{1}{4} \sum_{u=0}^{7} \sum_{v=0}^{7} C(u) \cdot C(v) \cdot \cos \frac{(2i + 1) u\pi}{16} \cdot \quad (4)$$

$$\cos \frac{(2j + 1) v\pi}{16} \cdot Yuv$$

The DCT processing and IDCT processing as shown above include a product sum operation. A product operation of this product sum operation is carried out by the parallel multipliers shown in FIG. 1. A multiplier in general requires a large number of adders and the like and has a large scale. Thus, there is a disadvantage that a conventional DCT processor requiring a plurality of parallel multipliers is not allowed to be sized-down.

In a semiconductor integrated circuit for carrying out a synchronization operation, the upper limit of operation speed is determined by a worst delay path (the path which provides a maximum delay). In the conventional configuration, the worst delay path is established by a parallel multiplier, and the operation speed depends on processing speed of the parallel multiplier. It is thus difficult to implement a fast DCT processing and a fast IDCT processing.

SUMMARY OF THE INVENTION

One object of the present invention is to provide a down-sized data processor which operates at a high speed.

Another object of the present invention is to provide a data processor for carrying out at least one of DCT and IDCT at a high speed.

A further object of the present invention is to provide a data processing method for carrying out at least one of DCT and IDCT at a high speed.

A data processor according to the present invention reduces the number of times of multiplication by utilizing characteristics inherent to a DCT operation or IDCT operation. A product sum operation is carried out by a successive operation employing a combination of a memory and an adder.

Since the number of times of multiplication is reduced and no parallel multipliers are employed, the DCT operation and IDCT operation are carried out at a high speed with fewer circuit components.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
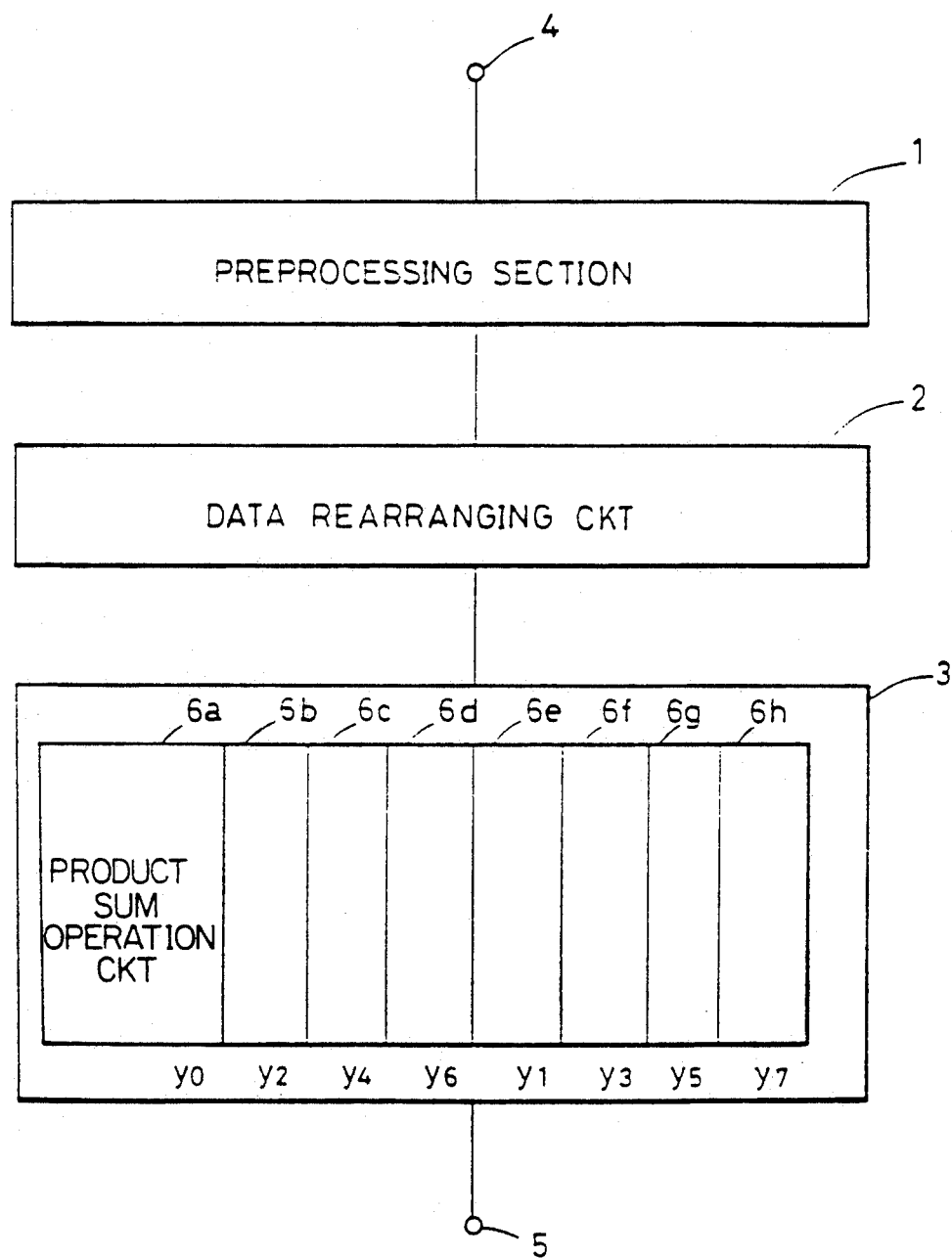
FIG. 4 is a diagram showing configuration of a one-dimensional DCT processor being one embodiment of the present invention.

FIG. 4 schematically shows configuration of a one-dimensional DCT processor being one embodiment of the present invention.

Referring to FIG. 4, the processor includes a preprocessing section 1 for receiving input data xi from an input terminal 4 to preprocess the received input data xi on the basis of characteristics inherent to DCT operation, a data rearranging circuit 2 for rearranging data output from preprocessing section 1, and a product sum operation section 3 for carrying out a product sum operation on data from data rearranging circuit 2.

This processor carries out an eight-point DCT operation. Thus, product sum operation section 3 includes eight product sum operation circuits $6a$–$6h$. Respective product sum operation circuits $6a$–$6h$ provide respective output data y0, y2, y4, y6, y1, y3, y5 and y7 to sequentially apply the output data to an output terminal 5, (the sequential application unit is not shown in the figure).

A description will now be made on the principle of an 8-point one-dimensional DCT processing operation of the present invention before a detailed description of configuration of each section. If the relationship between input data xi (i=0, 1, ... 7) and output data yj (j=0, 1, ... 7) shown in equations (1) and (2) is expressed in a matrix form, the following representation (5) is obtained:

$$\begin{bmatrix} y_0 \\ y_2 \\ y_4 \\ y_6 \\ y_1 \\ y_3 \\ y_5 \\ y_7 \end{bmatrix} = \begin{bmatrix} A & A & A & A & A & A & A & A \\ B & C & -C & -B & -B & -C & -C & B \\ A & -A & -A & A & A & -A & -A & A \\ C & -B & B & -C & -C & B & -B & C \\ D & E & F & G & -G & -F & -E & -D \\ E & -G & -D & -F & F & D & G & -E \\ F & -D & G & E & E & -G & D & -F \\ G & -F & E & -D & D & -E & F & -G \end{bmatrix} \begin{bmatrix} x_0 \\ x_2 \\ x_4 \\ x_6 \\ x_1 \\ x_3 \\ x_5 \\ x_7 \end{bmatrix} \quad (5)$$

where $$A = \frac{1}{2}\cos\frac{\pi}{4}, \quad B = \frac{1}{2}\cos\frac{\pi}{8}, \quad C = \frac{1}{2}\sin\frac{\pi}{8},$$

$$D = \frac{1}{2}\cos\frac{\pi}{16}, \quad E = \frac{1}{2}\cos\frac{3\pi}{16}, \quad F = \frac{1}{2}\sin\frac{3\pi}{16},$$

$$G = \frac{1}{2}\sin\frac{\pi}{16}$$

In derivation of the above relation (5), the well-known characteristics of trigonometric function such as $\cos\pi/4 = 1/\sqrt{2}$, $\cos(\pi \pm \theta) = -\cos\theta$, $\cos(\pi/2 \pm \theta) = \sin$ and the like are utilized. For example, $\cos(3\pi/8) = \sin(\pi/8)$ and the like are utilized.

In the above relation (5), a coefficient matrix is horizontally symmetrical with respect to columns. By use of this symmetry, relation (5) can be transformed to the following representation (6):

$$\begin{bmatrix} y_0 \\ y_2 \\ y_4 \\ y_6 \end{bmatrix} = \begin{bmatrix} A & A & A & A \\ B & C & -C & -B \\ A & -A & -A & A \\ C & -B & B & -C \end{bmatrix} \begin{bmatrix} x_0 + x_7 \\ x_1 + x_6 \\ x_2 + x_5 \\ x_3 + x_4 \end{bmatrix} \quad (6)$$

$$\begin{bmatrix} y_1 \\ y_3 \\ y_5 \\ y_7 \end{bmatrix} = \begin{bmatrix} D & E & F & G \\ E & -G & -D & -F \\ F & -D & G & E \\ G & -F & E & -D \end{bmatrix} \begin{bmatrix} x_0 - x_7 \\ x_1 - x_6 \\ x_2 - x_5 \\ x_3 - x_4 \end{bmatrix}$$

If a comparison is made between the above relations (5) and (6), it is apparent that the number of times of multiplication for acquiring output data yj is reduced to a half in relation (6) as compared to relation (5). DCT processing in accordance with relation (6) is carried out in this embodiment.

With reference to FIG. 4, preprocessing section 1 generates the following eight intermediate data from input data xi sequentially applied from input terminal 4 by selectively carrying out addition or subtraction. The intermediate data are: (x0+x7), (x1+x6), (x2+x5), (x3+x4), (x0−x7), (x1−x6), (x2−x5) and (x3−x4).

The result of preprocessing from preprocessing section 1 is represented in finite word length. In the following description, it is assumed that the preprocessing result is indicated by 8-bit data in two's complement notation.

In order to calculate output data yj by using the preprocessed data from preprocessing section 1, the matrix operation of relation (6) is carried out.

With respect to output data y2, for example, the following relation (7) is carried out:

$$y2 = B \cdot (x0 + x7) + C \cdot (x1 + x6) - C \cdot (x2 + x5) - B(x3 + x4) \quad (7)$$
$$= \sum_{k=1}^{4} B_k \cdot z_k$$

where $B_1 = B$, $B_2 = C$, $B_3 = -C$, $B_4 = -B$, $z_1 = (x0+x7)$, $z_2 = (x1+x6)$, $z_3 = (x2+x5)$, $z_4 = (x3+x4)$.

Data rearranging circuit 2 of FIG. 4 receives preprocessing results $z_k$ (k=1, ... 4) from preprocessing section 1. When receiving four necessary preprocessing results $z_k$, data rearranging circuit 2 outputs the least significant bits of respective four preprocessing results $z_k$ in parallel to product sum operation section 3. The parallel bit output is carried out sequentially in bit figure until the most significant bit is output.

Product sum operation circuit 6a for output data y2 carries out an operation in accordance with a relation (8) which is a further equivalent transformation of relation (7).

$$y2 = \sum_{n=1}^{7} \left[ \sum_{k=1}^{4} B_k \cdot z_{kn} \right] 2^{-n} + \sum_{k=1}^{4} B_k \cdot (-z_{k0}) \quad (8)$$

where $z_{kn}$ is nth-bit data of preprocessing result $z_k$, and $z_{k0}$ is the most significant bit of $z_k$. That is, $z_k < 0 | 7 > = (z_{k0}, z_{k1}, \ldots z_{k7})$. Data $z_k$ is obtained in the following relation (9):

$$z_k = -z_{k0} + \sum_{n=1}^{7} z_{kn} \cdot 2^{-n} \quad (9)$$

It should be noted that data $z_k$ is data of 8 bits represented in two's complement notation. Therefore, equations (7) and (8) are mathematically totally equivalent to each other except for a difference in order of product sum operations.

4-bit data $z_{1n}$, $z_{2n}$, $z_{3n}$ and $z_{4n}$ are applied in parallel to product sum operation circuit 6a for data y2. The values of coefficients B1, B2, B3 and B4 can be calculated in advance. Product sum operation circuit 6a stores therein a partial sum (10) shown below in the form of a ROM table and outputs a corresponding partial sum with 4-bit data $z_{1n}$, $z_{2n}$, $z_{3n}$ and $z_{4n}$ used as an address.

$$\sum_{k=1}^{4} B_k \cdot z_{kn} \quad (n = 0, \ldots 7) \quad (10)$$

This partial sum is accumulated by an internal accumulator, so that output data y2 is output from terminal 5. Although the sign of the most significant bit $b_{k0}$ is negative, this sign can be converted to be positive for addition operation in two's complement notation.

Referring to FIG. 4, in product sum operation section 3, product sum operation circuits 6a-6d apply the operation to the same data $z_k$ in parallel to produce output data y0, y2, y4 and y6. Product sum operation circuits 6e-6h apply the operation to the same data $w_k$ in parallel to produce output data y1, y3, y5 and y7.

Output data y0 to y7 are sequentially output in this order from output terminal 5 by a selector not shown. A description will now be given on a detailed configuration of each section shown in FIG. 1.

Figure 5:
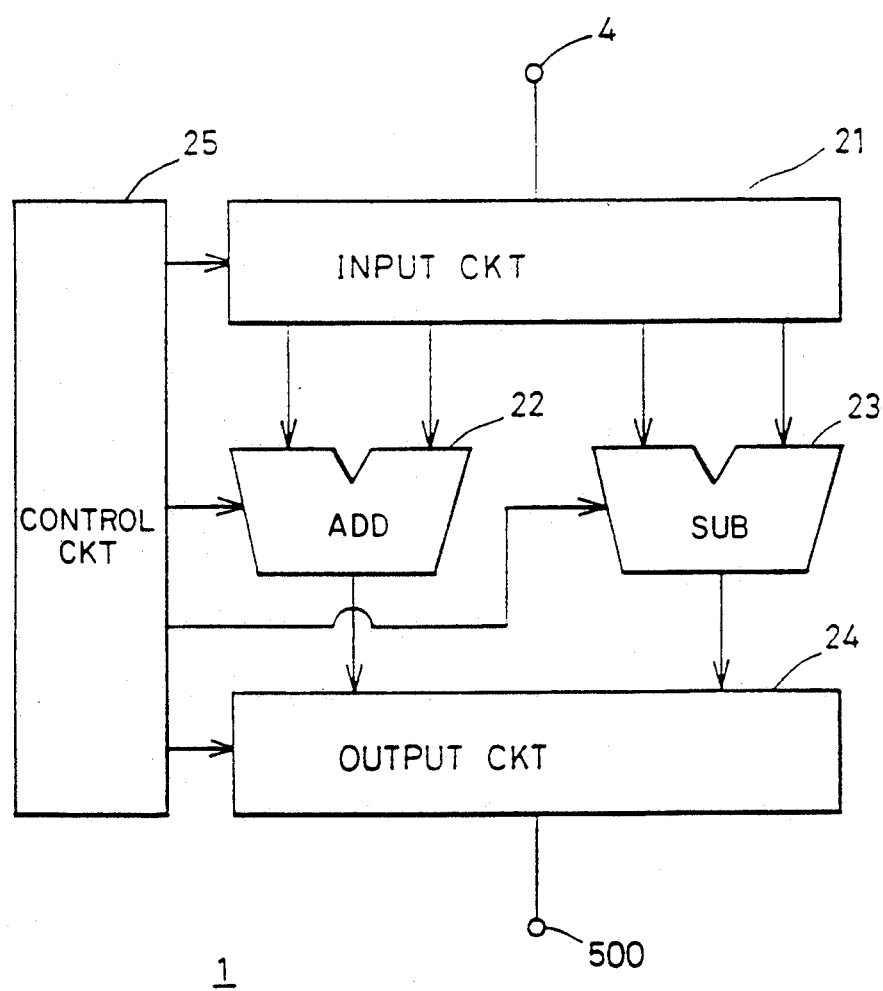
FIG. 5 is a diagram showing an example of configuration of a preprocessing section shown in FIG. 4.

FIG. 5 shows configuration of preprocessing section 1 shown in FIG. 4. Preprocessing section 1 includes an input circuit 21 for receiving input data xi sequentially applied from input terminal 4. Input circuit 21 outputs input data xp and xq in a predetermined combination under control by a control circuit 25. Here, a relation p+q=7 is satisfied. Input circuit 21 can be formed of a tapped shift register. Data at a desired stage can be read by selecting a tap under control by control circuit 25 by employing, for example, a multiplexer.

Preprocessing section 1 further includes a 2-input adder 22 for adding outputs of input circuit 21, a subtractor 23 for subtracting outputs of input circuit 21, and an output circuit 24 for selecting one of respective outputs of adder 22 and subtractor 23 under control by control circuit 25. Adder 22 and subtractor 23 carry out addition and subtraction for the applied data under control by control circuit 25.

Output circuit 24 preferably alternately selects the output of adder 22 and that of subtractor 23. An operation will now be described.

Input circuit 21 receives input data X to sequentially output sets of data (x0, x7), (x1, x6), (x2, x5), and (x3, x4).

Adder 22 adds the data of each set. Adder 22 sequentially outputs data $z_k$, i.e., (x0+x7), (x1+x6), (x2+x5) and (x3+x4).

Subtractor 23 sequentially outputs data $w_k$, i.e., (x0−x7), (x1−x6], (x2−x5) and (x3−x4).

Output circuit 24 alternately outputs data $z_k$ and data $w_k$.

Figure 1:
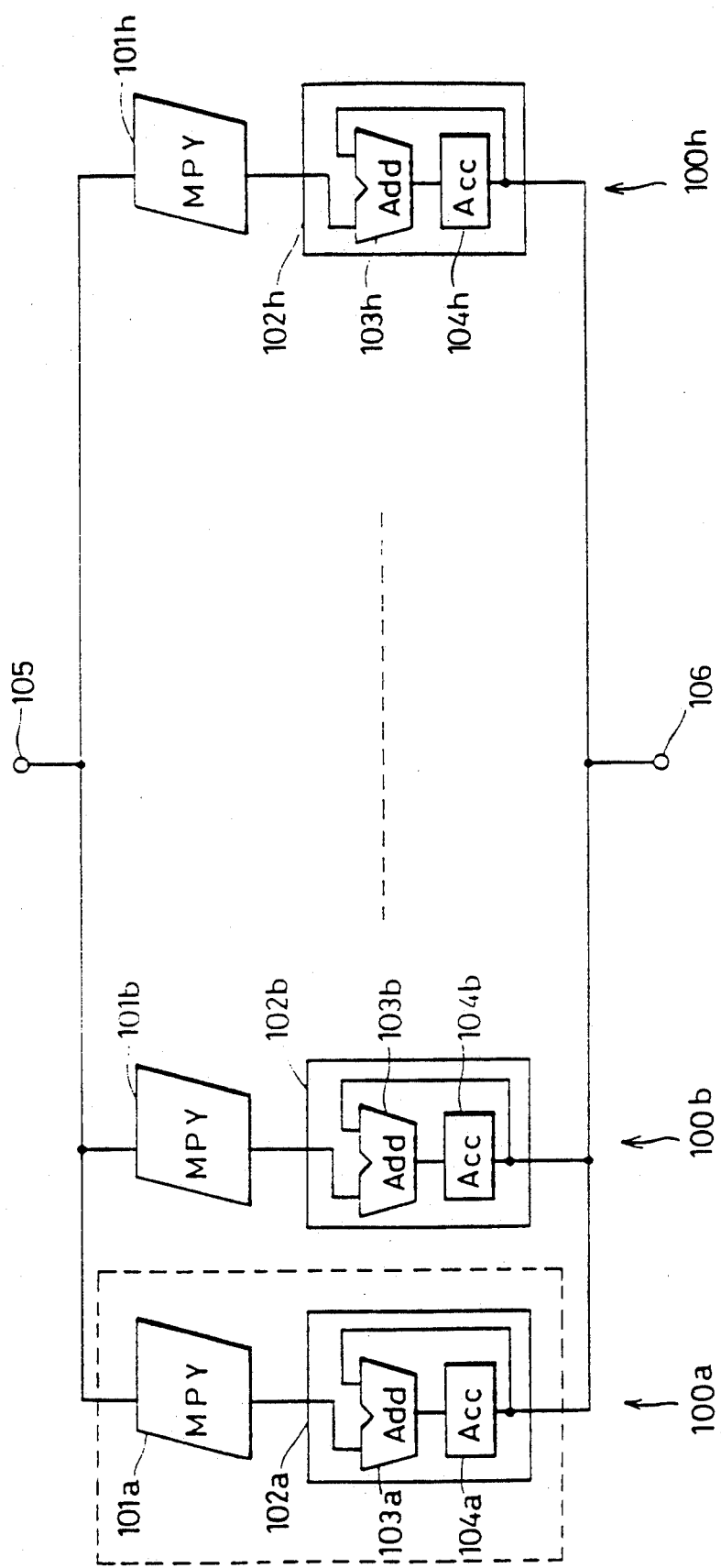
FIG. 1 is a diagram showing configuration of a conventional one-dimensional DCT processor.

Parallel multiplication circuits 6a to 6d of FIG. 1 carry out an operation in accordance with data $z_k$, while parallel multiplication circuits 6e to 6h carry out an operation in accordance with data $w_k$.

Output circuit 24 alternately outputs addition data $z_k$ and subtraction data $w_k$. This makes it possible to produce output data y0 to y7 in this order from product sum operation section 3 and implement a pipelined architecture for processing data in synchronization with a clock signal.

Figure 6:
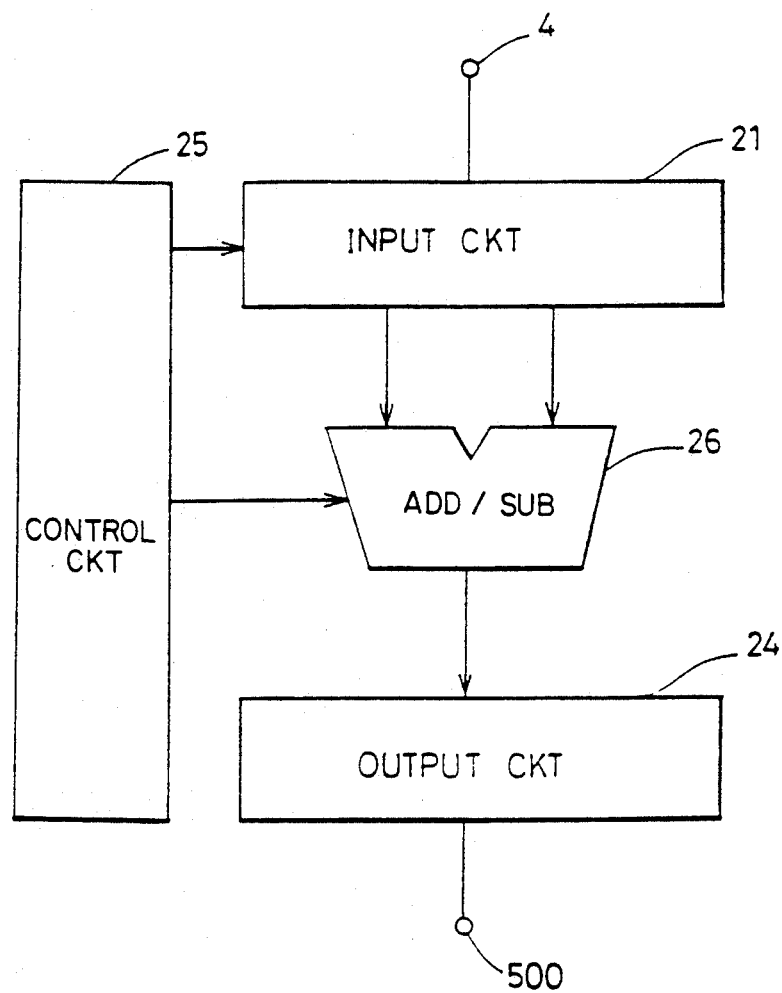
FIG. 6 is a diagram showing an example of modification of the preprocessing section of FIG. 5.

In that case, it is unnecessary that adder 22 and subtractor 23 carry out an arithmetic operation simultaneously. Accordingly, as shown in FIG. 6, an arithmetic unit 26 for alternately performing the adding processing and the subtracting processing under control by control circuit 25 may be employed. Output circuit 24 does not have to have a selecting function in the configuration of FIG. 6. Output circuit 24 is required to have a function of buffering and latching (in the case of a clock synchronizing operation) an output of arithmetic unit 26. In the configuration of FIG. 6, since the addition and subtraction are carried out in a single arithmetic unit 26, the circuit scale is reduced.

Such configuration may be employed that intermediate data $w_k$ is output after all intermediate data $z_k$ are output from preprocessing section 1.

Figure 7A:
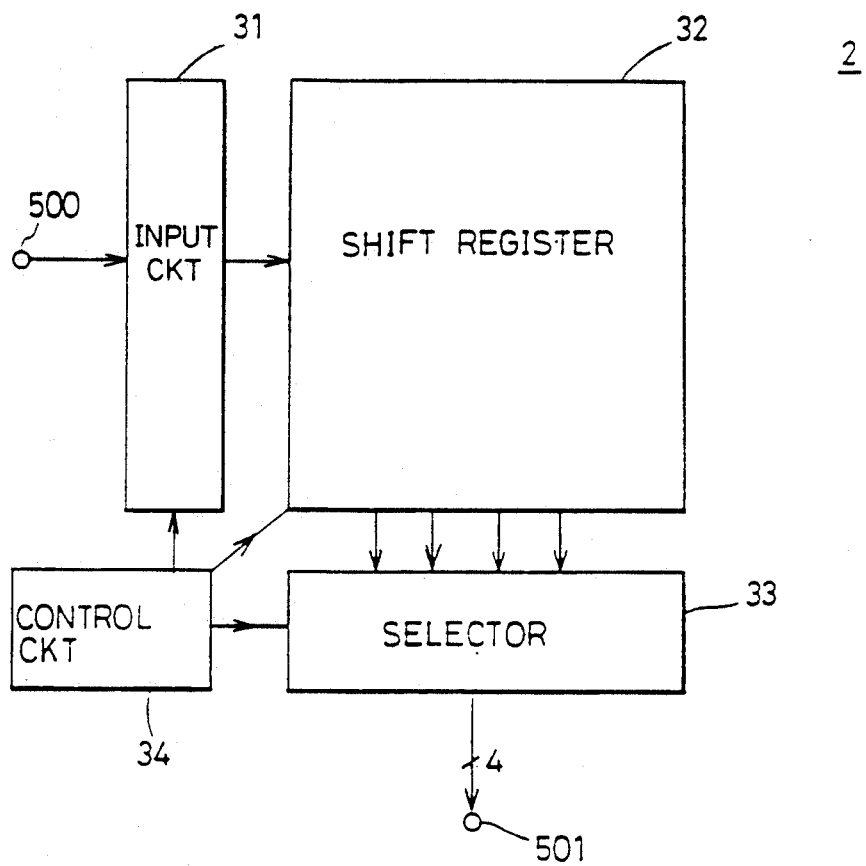
FIG. 7A is a diagram showing an example of configuration of a data rearranging circuit of FIG. 4.

FIG. 7A shows configuration of data rearranging circuit 2 of FIG. 1. Data rearranging circuit 2 includes an input circuit 31 for receiving intermediate data from a terminal 500, a shift register 32 for sequentially storing therein data from input circuit 31, and a selector 33 for sequentially reading four intermediate data stored in shift register 32 from the least significant bit.

After alternately receiving intermediate data $z_k$ and intermediate data $w_k$ and outputting all of intermediate data $z_k$ in advance, input circuit 31 sequentially outputs intermediate data $w_k$. This configuration can easily be implemented by using a register for storing intermediate data $w_k$ therein.

When intermediate data $w_k$ are applied after all of intermediate data $z_k$ are applied, input circuit 31 sequentially outputs intermediate data from terminal 500. Input circuit 31, however, has a function of latching intermediate data $w_k$ until the reading of intermediate data $z_k$ by the selector is completed. A data acceptation, latching and output operation of input circuit 31 is controlled by a control circuit 34.

Figure 7B:
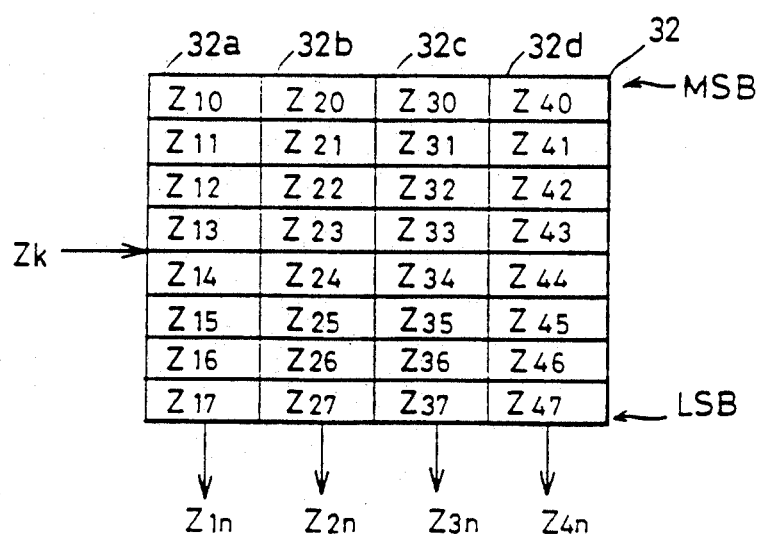
FIG. 7B is a diagram showing the contents of a shift register of FIG. 7A.

Shift register 32 stores therein four intermediate data from input circuit 31. Shift register 32 includes four 8-bit registers 32a–32d in a row direction as shown in FIG. 7B. FIG. 7B shows a state where four intermediate data $z_1$ to $z_4$ are stored in shift register 32.

Intermediate data $z_k$ from input circuit 31 are sequentially stored in registers 32a–32d. After all intermediate data $z1$ to $z4$ are stored in register 32, data of registers 32a–32d are read in parallel sequentially from the respective least significant bits. Such configuration can be implemented by shift registers capable of shifting in both row and column directions. Even by use of a shift register capable of shifting only in the row direction, if a register stage is selected by selector 33, the data rearranging operation can be realized.

A data bit shifting operation of shift register 32 is controlled by control circuit 34. Selector 33 reads data of 4 bits in parallel from shift register 32 under control by control circuit 34.

Four-bit data $z_{kn}$ are output from a terminal 501 in the configuration of FIG. 7A.

Figure 8:
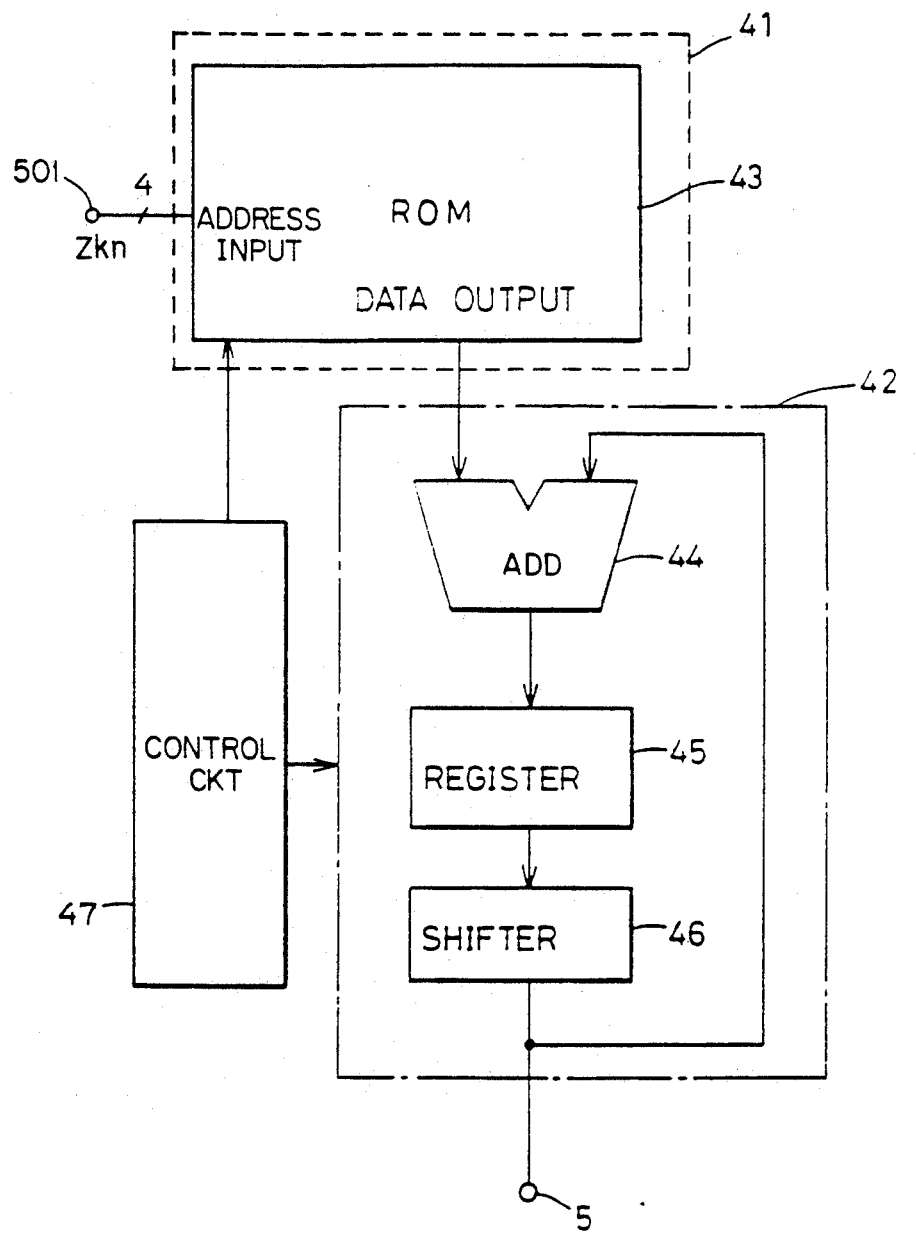
FIG. 8 is a diagram showing an example of configuration of a product sum operation circuit of FIG. 4.

FIG. 8 shows configuration of product sum operation circuit 6. Referring to FIG. 8, product sum operation circuit 6 includes a partial sum generating circuit 41 for generating a partial sum in accordance with data from terminal 501, and an accumulator 42 for accumulating an output of partial sum generating circuit 41.

Partial sum generating circuit 41 includes an ROM (Read Only Memory) 43 for receiving 4-bit data $z_{kn}$ and as an address signal. ROM 43 stores the partial sum shown in, for example, equation (10) in the form of table and, when supplied with 4-bit data $z_{kn}$, ROM 43 outputs a corresponding value. By constructing this partial sum generating circuit 41 in the form of the ROM table, a partial sum can be generated at a high speed without any multiplication.

Accumulator 42 includes an adder 44 for receiving a partial sum from partial sum generating circuit 41 at its one input, an accumulating register 45 for storing an output of adder 44, and a shifter 46 for shifting an output of register 45 by predetermined bits to apply the shifted output to the other input of adder 44. Output data $y_j$ is applied from shifter 46 to terminal 5. A description will now be made on an operation thereof, taking output data $y2$ as an example.

Four-bit data $z_{kn}$ are applied in turn from the least significant bit to product sum generating circuit 41.

Product sum generating circuit 41 sequentially outputs a partial sum $$\sum_{k=1}^{4} B_k \cdot z_{kn}$$

from ROM 43.

First, a partial sum $$\sum_{k=1}^{4} B_k \cdot z_{k1}$$

is stored in register 45.

Then, a partial sum $$\sum_{k=1}^{4} B_k \cdot z_{k1}$$

is output from partial sum generating circuit 41.

Shifter 46 shifts the contents of register 45 by one bit. Accordingly, an output of shifter 46 is shown as below:

$$\left[\sum_{k=1}^{4} B_k \cdot z_{k7}\right] 2^{-1}$$

The output of adder 44 is shown as below:

$$\sum_{k=1}^{4} B_k \cdot z_{k6} + \left(\sum_{k=1}^{4} B_k \cdot z_{k7}\right) \cdot 2^{-1}$$

By sequentially repeating this operation, the following output (11) is stored in register 45.

$$\sum_{n=1}^{7} \left[\sum_{k=1}^{4} B_k \cdot z_{kn}\right] \cdot 2^{-n+1} \quad (11)$$

If data $z_{k0}$ is applied, the contents of register 45 is the value shown in relation (8) since the data represented by the above relation (11) is shifted by one bit and then added by adder 44. After that, the shifting operation by shifter 46 is stopped and the contents of register 45 is read, whereby output data $y2$ is obtained.

The operation of partial sum generating circuit 41 and accumulator 42 is carried out by control circuit 47.

Figure 9:
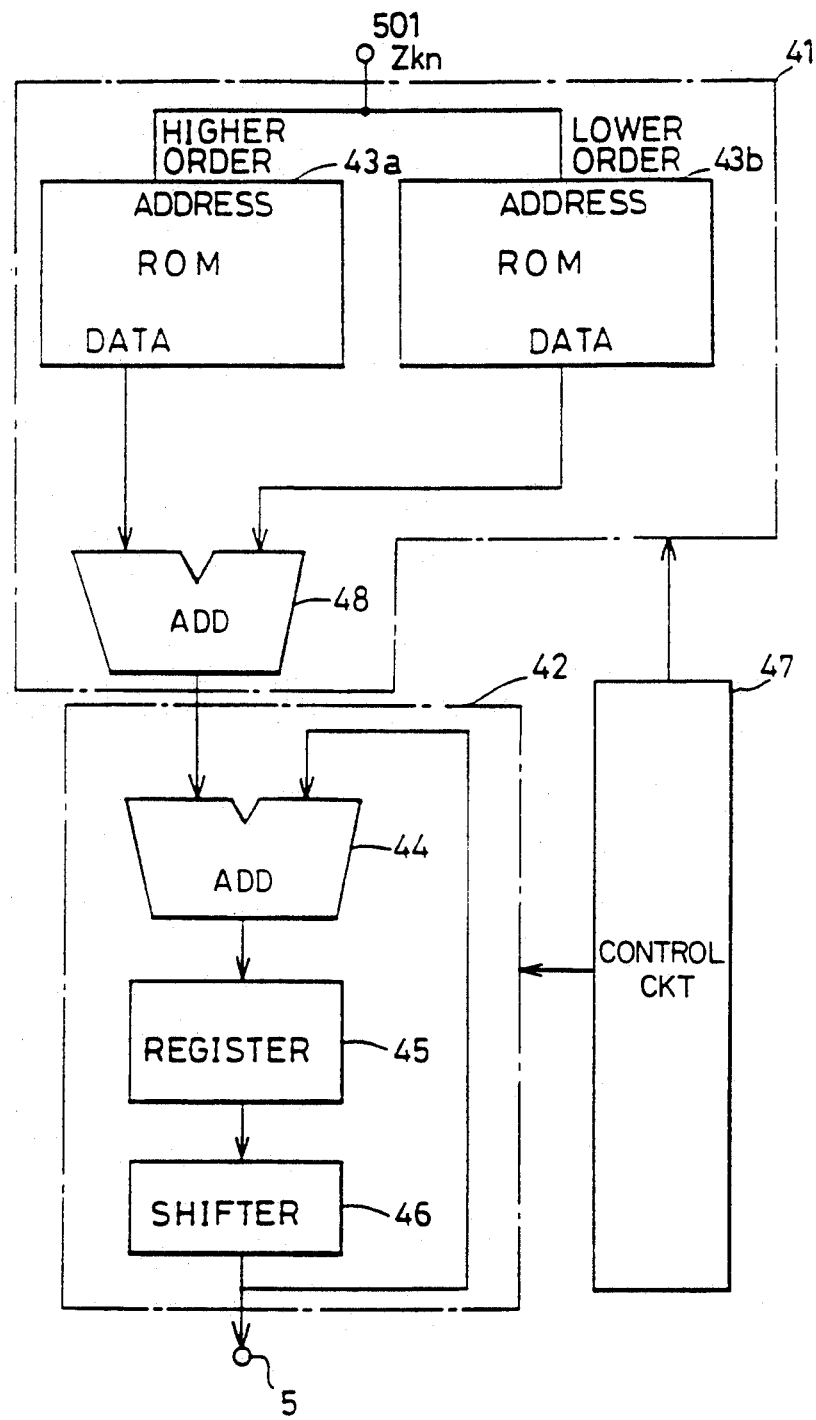
FIG. 9 is a diagram of an example of modification of the product sum operation circuit of FIG. 8.

FIG. 9 shows another configuration of a product sum operation circuit. The product sum operation circuit shown in FIG. 9 is different from the configuration shown in FIG. 8 in that a partial sum generating circuit 41 includes two ROMs 43a and 43b and an adder 48 for adding outputs of ROMs 43a and 43b.

ROM 43a receives higher order bits, while ROM 43b receives lower order bits. In this configuration, partial sums P and Q shown in the following equations are made by ROMs 43a and 43b.

$$P = \sum_{k=1}^{2} B_k \cdot z_{kn}$$

$$Q = \sum_{k=3}^{4} B_k \cdot z_{kn}$$

In the configuration of FIG. 9, the number of words to be stored into the ROMs is drastically reduced. This is because the number of words to be stored is determined by the number of bits of an address signal and increased in proportion to two's power of the bit number.

Figure 10:
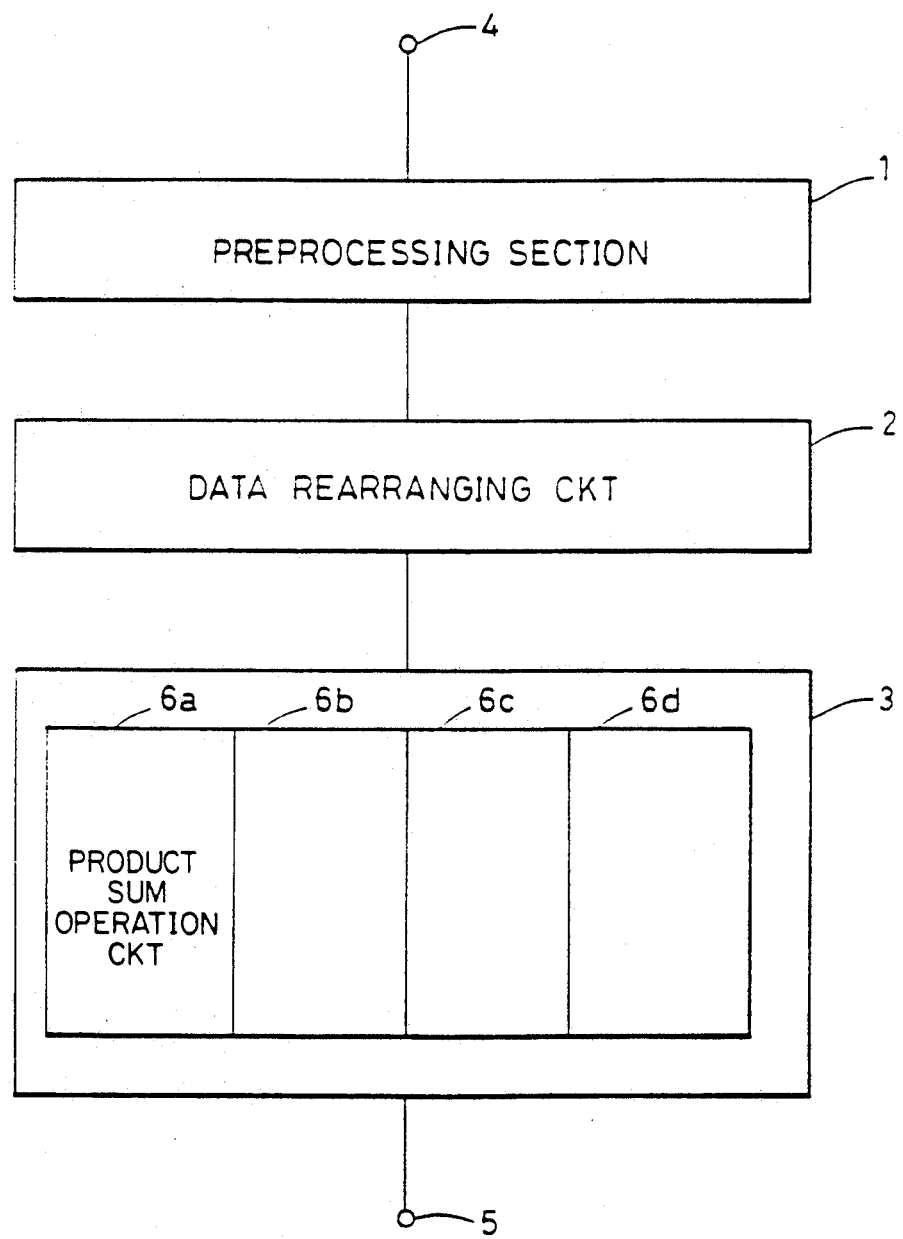
FIG. 10 is a diagram showing an example of modification of the one-dimensional DCT processor of FIG. 4.

In the above configuration, product sum operation section 3 includes eight product sum operation circuits 6a–6h. Intermediate data $z_k$ and $w_k$ are not calculated simultaneously. When intermediate data $w_k$ are calculated after all intermediate data $z_k$ are calculated and then output data y0, y2, y4 and y6 are calculated, product sum operation section 3 can be formed of four product sum operation circuits 6a–6d as shown in FIG. 10.

Product sum operation circuits 6a–6d calculate y0 and y1, y2 and y3, y4 and y5, and y6 and 7, respectively. The contents of an ROM for partial sum generation is changed in accordance with intermediate data $z_k$ and $w_k$. If the ROM is structured in bank architecture, the change of the coefficient table can easily be realized.

Figure 11:
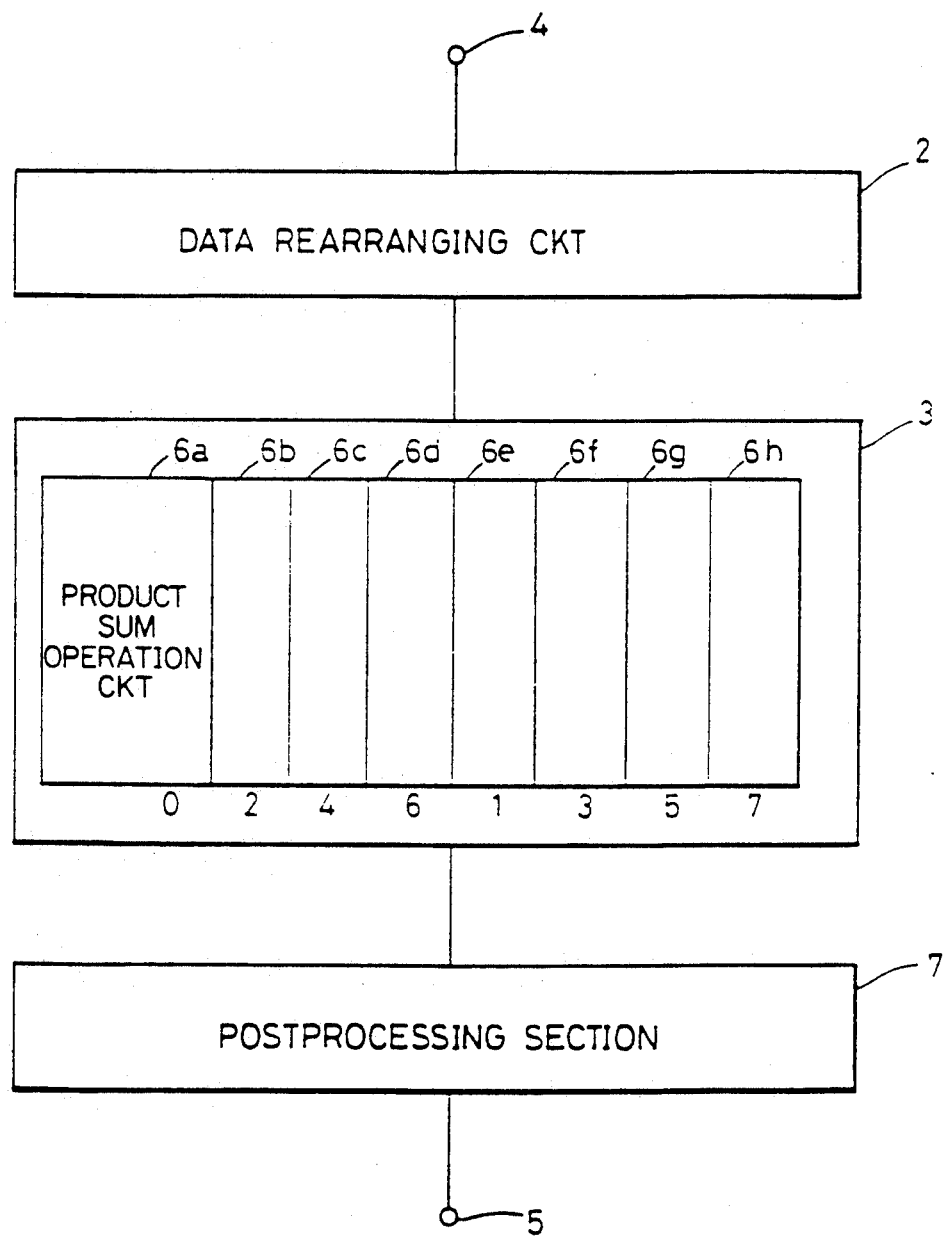
FIG. 11 is a diagram showing configuration of a one-dimensional IDCT processor being another embodiment of the present invention.

A description will now be made on a structure for an IDCT operation with reference to FIG. 11. Referring to FIG. 11, an 8-point one-dimensional IDCT processor includes a data rearranging circuit 2 for rearranging data from an input terminal 4, a product sum operation section 3 for performing a production sum operation in accordance with an output of data rearranging circuit 2, and a postprocessing section 7 for carrying out addition and subtraction of a predetermined combination of outputs of product sum operation section 3.

Data rearranging circuit 2 and postprocessing section 7 are of the same configurations as those of rearranging circuit 2 and preprocessing section 1 of FIG. 4, respectively. An operation will now be described.

Input data yj (j=0, 1, . . . 7) applied to terminal 4 undergoes an IDCT processing, so that output data xi (i=0, 1, . . . 7) is transmitted to terminal 5. The relationship between data yj and xi is represented in the following matrix form (12).

$$\begin{bmatrix} x0 \\ x1 \\ x2 \\ x3 \\ x4 \\ x5 \\ x6 \\ x7 \end{bmatrix} = \begin{bmatrix} A & B & A & C & D & E & F & G \\ A & C & -A & -B & E & -G & -D & -F \\ A & -C & -A & B & F & -D & G & E \\ A & -B & A & -C & G & -F & E & -D \\ A & -B & A & -C & -G & F & -E & D \\ A & -C & -A & B & -F & D & -G & -E \\ A & C & -A & -B & -E & G & D & F \\ A & B & A & C & -D & -E & -F & -G \end{bmatrix} \begin{bmatrix} y0 \\ y2 \\ y4 \\ y6 \\ y1 \\ y3 \\ y5 \\ y7 \end{bmatrix} \quad (12)$$

where $$A = \frac{1}{2}\cos\frac{\pi}{4}, B = \frac{1}{2}\cos\frac{\pi}{8}, C = \frac{1}{2}\sin\frac{\pi}{8},$$

$$D = \frac{1}{2}\cos\frac{\pi}{16}, E = \frac{1}{2}\cos\frac{3\pi}{16}, F = \frac{1}{2}\sin\frac{3\pi}{16},$$

$$G = \frac{1}{2}\sin\frac{\pi}{16}$$

This coefficient matrix is a transposed matrix of the coefficient matrix of equation (5). If the symmetry with respect to rows of the coefficient matrix of expression (12) is utilized, expression (12) is changed to the following equivalent expression (13).

$$\begin{bmatrix} x0 \\ x1 \\ x2 \\ x3 \end{bmatrix} = \begin{bmatrix} A & B & A & C \\ A & C & -A & -B \\ A & -C & -A & B \\ A & -B & A & -C \end{bmatrix} \begin{bmatrix} y0 \\ y2 \\ y4 \\ y6 \end{bmatrix} + \begin{bmatrix} D & E & F & G \\ E & -G & -D & -F \\ F & -D & G & E \\ G & -F & E & -D \end{bmatrix} \begin{bmatrix} y1 \\ y3 \\ y5 \\ y7 \end{bmatrix} \quad (13)$$

$$\begin{bmatrix} x7 \\ x6 \\ x5 \\ x4 \end{bmatrix} = \begin{bmatrix} A & B & A & C \\ A & C & -A & -B \\ A & -C & -A & B \\ A & -B & A & -C \end{bmatrix} \begin{bmatrix} y0 \\ y2 \\ y4 \\ y6 \end{bmatrix} - \begin{bmatrix} D & E & F & G \\ E & -G & -D & -F \\ F & -D & G & E \\ G & -F & E & -D \end{bmatrix} \begin{bmatrix} y1 \\ y3 \\ y5 \\ y7 \end{bmatrix}$$

It should be noted that there are only two types of the coefficient matrix of expression (13). Assume that these two types are M and N. The processor shown in FIG. 11 carries out an IDCT operation in accordance with expression (13).

Data rearranging circuit 2 receives data yj (j=0, 1, . . . 7) from terminal 4 to rearrange data y0, y2, y4 and y6 and sequentially output the rearranged data from the least significant bit. That is, 4-bit data $y_{0n}$, $y_{2n}$, $y_{4n}$ and $y_{6n}$ (n=0, 1, . . . 7) of input data yj are output from data rearranging circuit 2, so that generation and accumulation of partial sums are carried out. As intermediate data, the following data is output:

$$\sum_{n=1}^{7}\left[\sum_{k=1}^{4} B_{k'} \cdot y_{k'n}\right] \cdot 2^{-n} + \sum_{k'=1}^{4} B_{k'} \cdot (-y_{k'0})$$

This result corresponds to, for example, an intermediate term M2=(A·y0−C·y2−A·y4+B·y6) for x2. Then, data $y_{1n}$, $y_{3n}$, $y_{5n}$ and $y_{7n}$ (n=0, 1, . . . 7) are output from data rearranging circuit 2. The bit data is subjected to a product sum operation in product sum operation section 3. Accordingly, the remaining terms are obtained. For example, an intermediate term N2=(F·y1−D·y3+G·y6+E·y7) for x2 is obtained. Intermediate terms Mi (i=0, 1, . . . 7) and Ni (i=0, 1, . . . 7) are output in turn from product sum operation section 3. From expression (13), the following relations are satisfied: Mi=M$_{7-i}$, and Ni=N$_{7-i}$.

Data rearranging circuit 2 may alternately output data bits (y0, y2, y4, y6) and data bits (y1, y3, y5, y7). Each of product sum operation circuits 6a–6d calculates Mi (=M$_{7-i}$), and each of product sum operation circuits 6e–6h calculates Ni (=N$_{7-i}$).

Postprocessing section 7 obtains a sum of and a difference between intermediate data Mi and Ni to generate output data xi and output the same to terminal 5. Accordingly, the following relation is obtained:

xi=Mi+Ni (i=0, 1, 2, 3)

xi=Mi−Ni (i=4, 5, 6, 7)

Postprocessing section 7 has the same configuration as that of FIG. 5 or 6. In that case, input circuit 21 sequentially or alternately receives intermediate terms Mi (i=0 to 3), Ni (i=0 to 3) to apply a desired combination of the terms to adder/subtractors 22, 23 (or 26). The order in which data are selected in the input circuit is made by control circuit 25. In this case, data may be applied in the order of x0, x7, x1, x6, x2, x5, x3, x4 to output circuit 24, and output circuit 24 may output the data in the order of x0, x1, . . . x7.

This one-dimensional IDCT processor can also be structured such that a single product sum operation circuit 6 calculates both intermediate terms Mi and Ni (i=0 to 3).

The product sum operation in DCT processing and that in IDCT processing are identical to each other except for their coefficient matrixes. Accordingly, as shown in FIG. 12, a processor capable of selectively performing the DCT processing and the IDCT processing is obtained.

Figure 12:
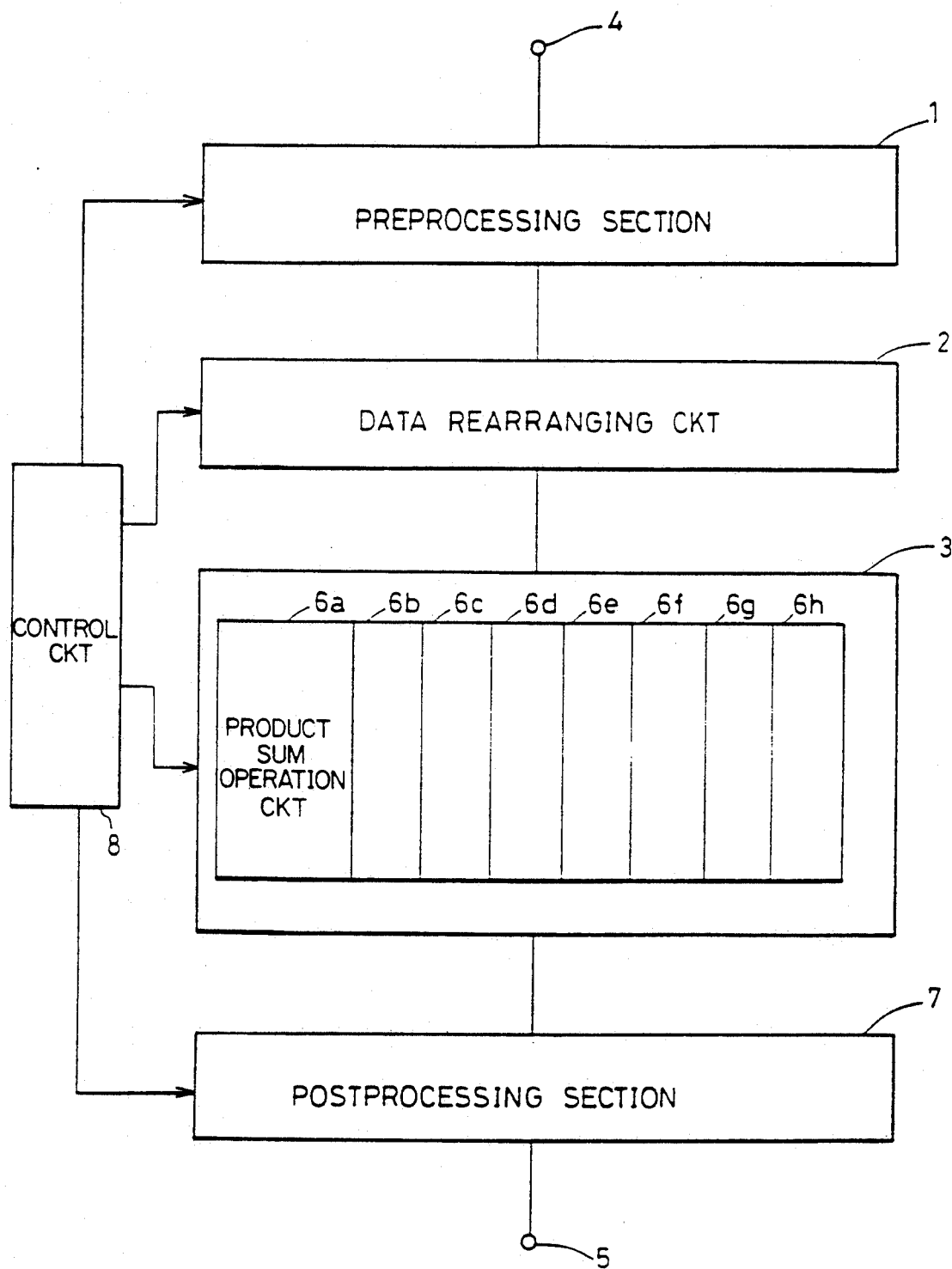
FIG. 12 is a diagram showing configuration of a one-dimensional DCT/IDCT processor being still another embodiment of the present invention.

Referring to FIG. 12, the processor includes a preprocessing section 1, a data rearranging circuit 2, a product sum operation section 3, a postprocessing section 7 and a control circuit 8.

Preprocessing section 1 has its input connected to an input terminal 4 and its output connected to data rearranging circuit 2. Data rearranging circuit 2 has its output connected to product sum operation section 3. Product sum operation section 3 has its output connected to an input of postprocessing section 7. The output of postprocessing section 7 is supplied through an output terminal 5. Product sum operation section 3 includes first to eighth product sum operation circuits 6a–6h.

Control circuit 8 switches DCT operation and IDCT operation and also controls the operation of the respective circuits.

A description will now be made on an operation of the processor shown in FIG. 12. In the case of DCT processing, data is allowed to go intactly through postprocessing section 7. This causes the processor of FIG. 12 to function equally to the DCT processor shown in FIG. 4. That is, data input from input terminal 4 undergoes addition/subtraction in preprocessing section 1 and then rearranged in data rearranging circuit 2. The rearranged data is then transmitted in turn from lower order bits to the product sum operation section. The data subjected to a product sum operation shown in, for example, expression (5) in the product sum operation section passes through postprocessing section 7 and is then directly output from output terminal 5.

In the case of inverse DCT processing, data passes intactly through preprocessing section 1, whereby the processor functions equally to the inverse DCT processor shown in FIG. 11 as follows. That is, the data input from input terminal 4 passes intactly through preprocessing section 1 and then rearranged in data rearranging circuit 2. The rearranged data is transmitted in turn from lower order bits to the product sum operation section. The data subjected to the product sum operation in the product sum operation section is transmitted to postprocessing section 7 and then subjected to addition/subtraction for calculating output data. The added/subtracted data is output from output terminal 5.

Changes in coefficients in product sum operation section 3 are made by control circuit 1. This is easily realized by switching of banks of ROM or the like.

The above-described processor performs a one-dimensional DCT or IDCT operation. This processor can be developed to be able to perform a two-dimensional DCT or IDCT operation.

Figure 13:
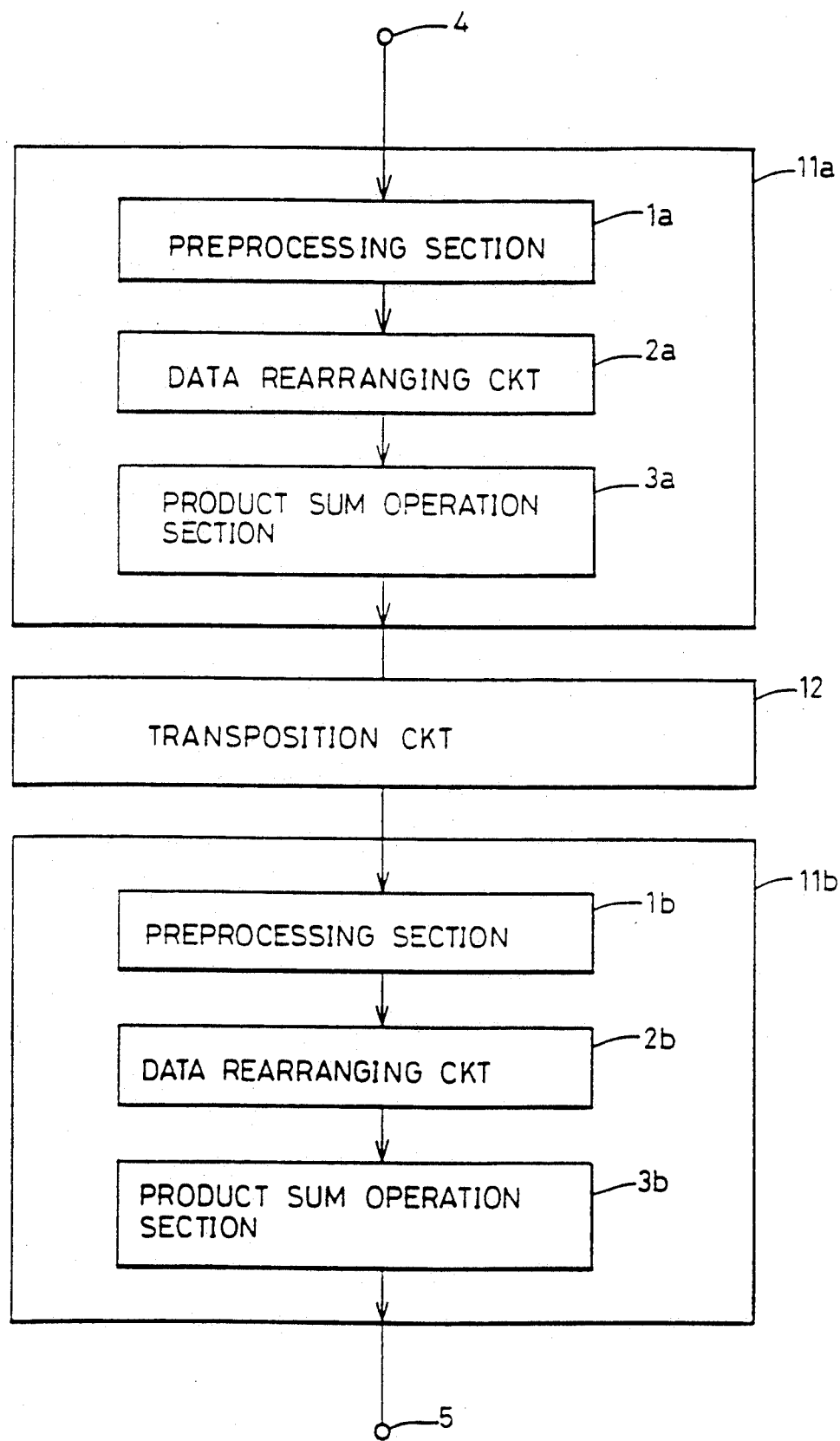
FIG. 13 is a diagram showing configuration of a two-dimensional DCT processor being still another embodiment of the present invention.

FIG. 13 shows configuration of a two-dimensional DCT processor according to the present invention. Referring to FIG. 13, the two-dimensional DCT processor includes a first one-dimensional DCT processing section 11a, a second one-dimensional DCT processing section 11b and a transposition circuit 12.

First, one-dimensional DCT processing section 11a carries out DCT processing with respect to rows, while second one-dimensional DCT processing section 11b carries out DCT processing with respect to columns. Transposition circuit 12 outputs in the order of columns the data applied in the order of rows. First and second processing sections 11a and 11b have the same configuration as that of the one-dimensional DCT processor shown in FIG. 1 and include a preprocessing section 1 (1a, 1b), a data rearranging circuit 2 (2a, 2b) and a product sum operation section 3 (3a, 3b). A description will now be made on a two-dimensional DCT processing of 8×8 points taken as an example.

If expression (3) is rewritten, the following expression (14) is obtained:

$$Yuv = \sum_{j=0}^{7} A(j, v) \cdot \left( \sum_{i=0}^{7} A(i, u) \cdot xij \right) \quad (14)$$

Input terminal 4 is supplied with input data in the order of rows. That is, 8-term row vector data x(0, j), x(1, j) . . . x (7, j) (j=0, 1, . . . 7) are applied in turn.

Preprocessing section 1a carries out preprocessing for the respective row vector data. For a zeroth row, for example, data (x00±x07), (x01±x06), (x02±x05) and (x03±x04) are output from preprocessing section 1a. Data rearranging circuit 2a rearranges four words (four addition data or four subtraction data) to output the rearranged data to product sum operation section 3a. Product sum operation section 3a applies a product sum operation to the applied data. The processing operation of data rearranging circuit 2a and product sum operation section 3a is the same as those of the processor shown in FIG. 4.

Accordingly, first one-dimensional DCT processing section 11a outputs in the order of rows 8-term row vector data Rk subjected to one-dimensional DCT processing with respect to a row direction. Rk is an 8-term row vector of Rk=(Rk0, Rk1, . . . Rk7), where k=0, 1, . . . 7.

This intermediate data Rk is applied to transposition circuit 12 and stored therein in the order of rows. When 8-row intermediate data R0–R7 are stored in transposition circuit 12, transposition circuit 12 outputs intermediate data in the order of columns to second one-dimensional DCT processing circuit 11b. The intermediate data stored in transposition circuit 12 is data which is subjected to an operation processing with respect to "i" in expression (14). Transposition circuit 12 outputs intermediate data in the order of columns. In the zeroth column, for example, data R00, R10, R20, . . . R70 are read in turn.

Second one-dimensional DCT processing section 11b carries out the same preprocessing, the same data rearranging processing and the same product sum operation processing for each column as those of first one-dimensional DCT processing section 11a. Accordingly, second one-dimensional DCT processing section 11b outputs data subjected to addition with respect to "j" in expression (14). That is, 8-term column vector data are output in the order of columns from output terminal 5. The data appearing on output terminal 5 are data subjected to one-dimensional DCT processing in both row and column directions, i.e., two-dimensional DCT processing.

Figure 2:
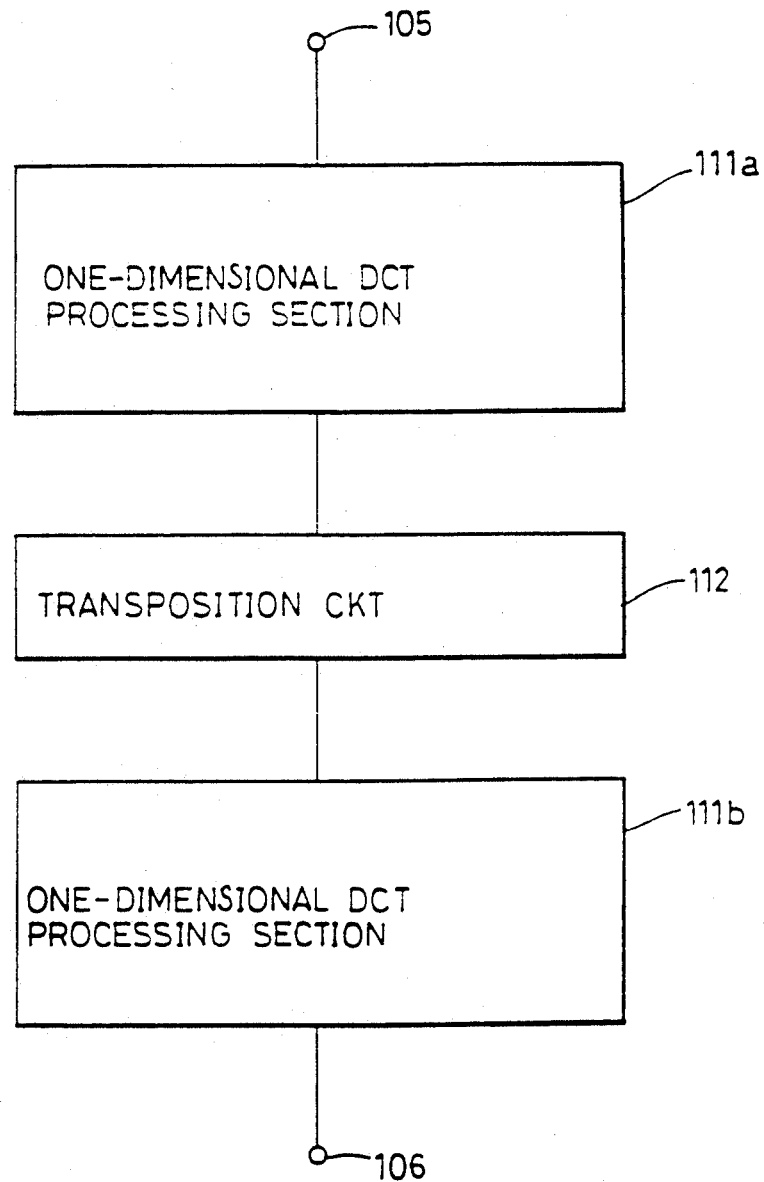
FIG. 2 is a diagram showing configuration of a conventional two-dimensional DCT processor.
Figure 3:
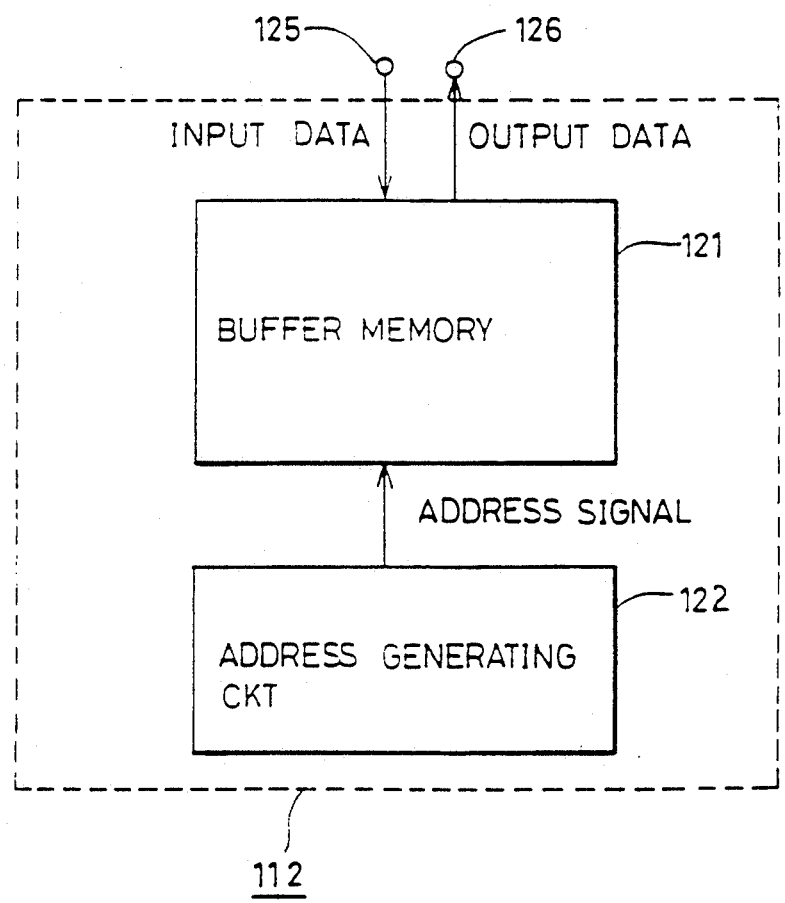
FIG. 3 is a diagram showing configuration of a transposition circuit of FIG. 2.

Like the transposition in the circuit shown in FIG. 2, transformation from rows to columns in transposition circuit 12 is realized by changing an address of a buffer memory in the row direction in data writing and in the column direction in data reading.

Figure 14:
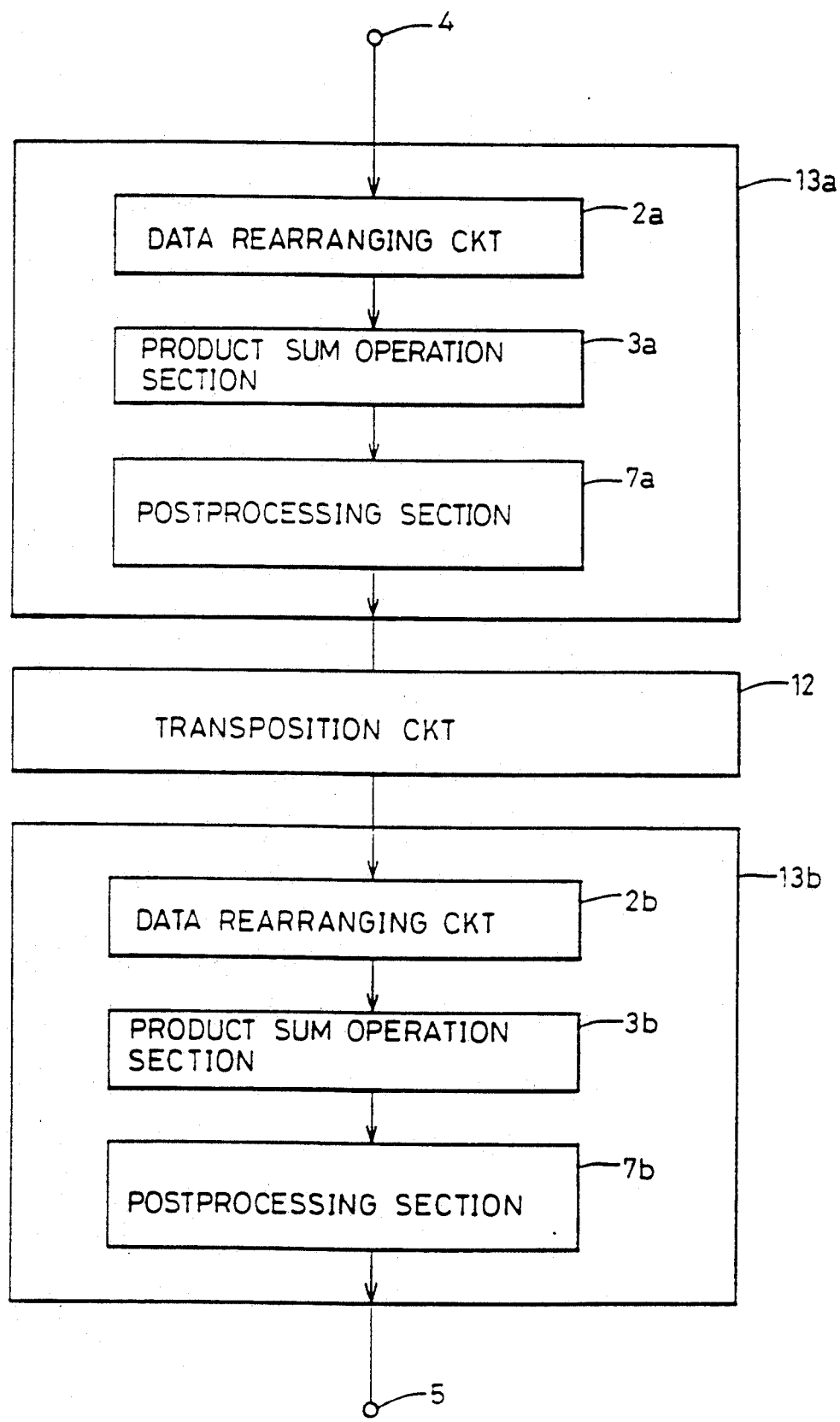
FIG. 14 is a diagram showing configuration of a two-dimensional IDCT processor being still another embodiment of the present invention.

Also, the two-dimensional IDCT processing can be realized by expanding the one-dimensional IDCT processor shown in FIG. 11. FIG. 14 shows configuration of a two-dimensional IDCT processor.

Referring to FIG. 14, the two-dimensional IDCT processor includes a first one-dimensional IDCT processor 13a and a second one-dimensional IDCT processor 13b.

First, one-dimensional IDCT processor 13a includes a data rearranging circuit 2a, a product sum operation section 3a and a postprocessing section 7a. Second one-dimensional IDCT processor 13b includes a data rearranging circuit 2b, a product sum operation section 3b and a postprocessing section 7b. Both first and second one-dimensional IDCT processors 13b and 13b carry out the same processing as that of the one-dimensional IDCT processor shown in FIG. 11.

Input terminal 4 is supplied with input data in the order of rows. First IDCT processor 13a carries out an IDCT processing with respect to rows.

Transposition circuit 12 sequentially stores therein intermediate data applied in the order of rows from first IDCT processor 13a and outputs the stored intermediate data in the order of columns.

Second IDCT processor 13b carries out an IDCT processing for the respective columns. Accordingly, output terminal 5 is supplied with the data subjected to the IDCT processing in both row and column directions, i.e., two-dimensional IDCT processing, in the order of columns.

Figure 15:
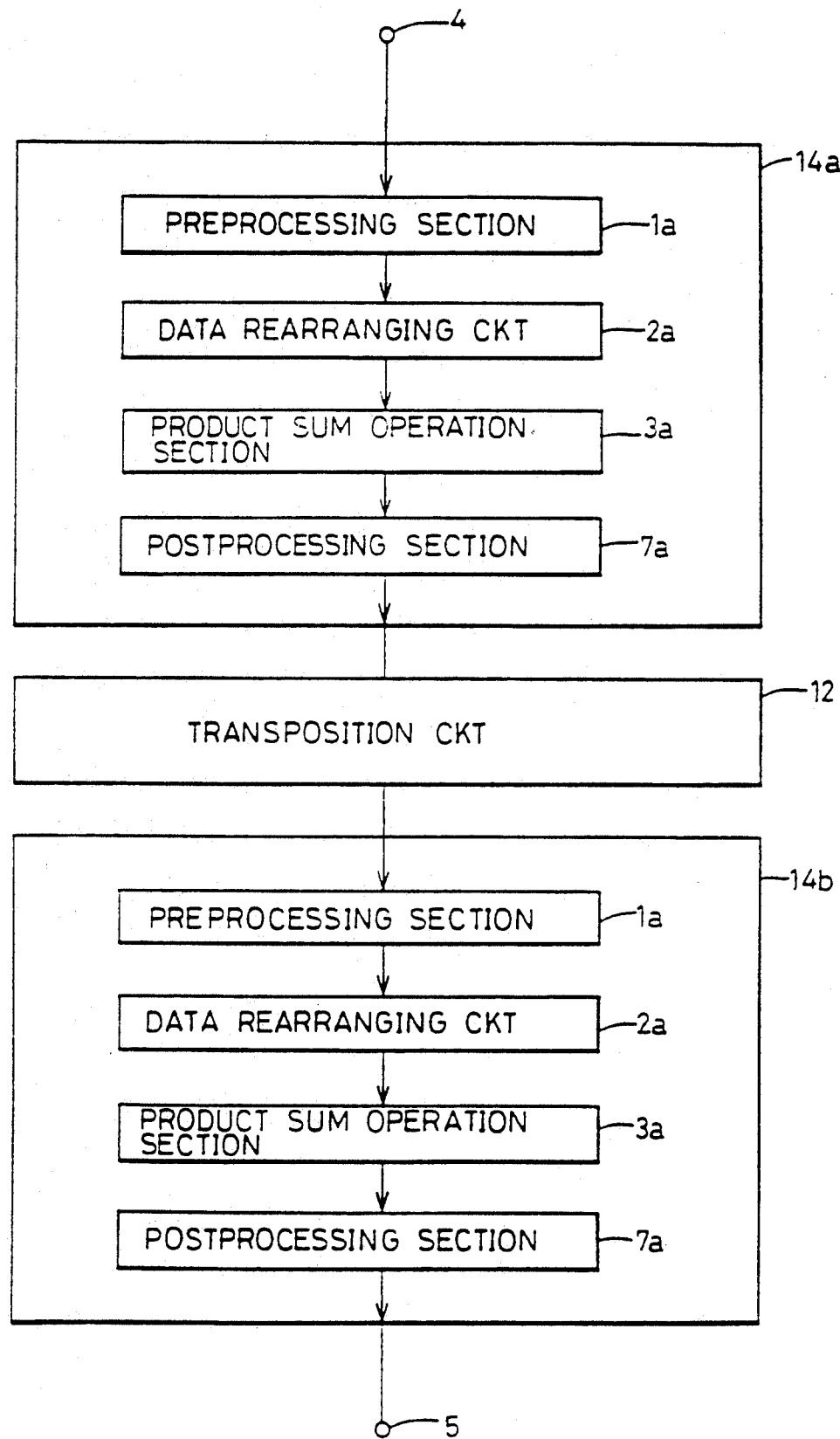
FIG. 15 is a diagram showing configuration of a two-dimensional DCT/IDCT processor being still another embodiment of the present invention.

FIG. 15 shows configuration of a two-dimensional DCT/IDCT processor being still another embodiment of the present invention. The processor of FIG. 15 includes a first one-dimensional DCT/IDCT processor 14a, a second one-dimensional DCT/IDCT processor 14b, and a transposition circuit 12 provided between processors 14a and 14b.

First and second processors 14a and 14b are of the same configuration as that of the processor shown in FIG. 12 and include a preprocessing section 1 (1a, 1b), a data rearranging circuit 2 (2a, 2b), a product sum operation section 3 (3a, 3b) and a postprocessing section 7 (7a, 7b).

In the configuration of FIG. 15, like the configuration shown in FIG. 12, if preprocessing sections 1a and 1b and postprocessing sections 7a and 7b are selectively set in a through state and coefficients (used in the partial sum generation circuit) of product sum operation sections 3a and 3b are selected, then two-dimensional DCT and IDCT processings can selectively be carried out.

An operation of the processor of FIG. 15 is identical to those of the processors of FIGS. 13 and 14. One processing mode of the DCT processing and the IDCT processing is set by a control circuit not shown (corresponding to control circuit 8 of FIG. 12).

Although the foregoing description has not been concerned with implementation forms of the DCT processors, the use of the above-described configuration makes it possible to easily incorporate all of DCT (inverse DCT) functions integrally on a semiconductor integrated circuit.

Figure 16:
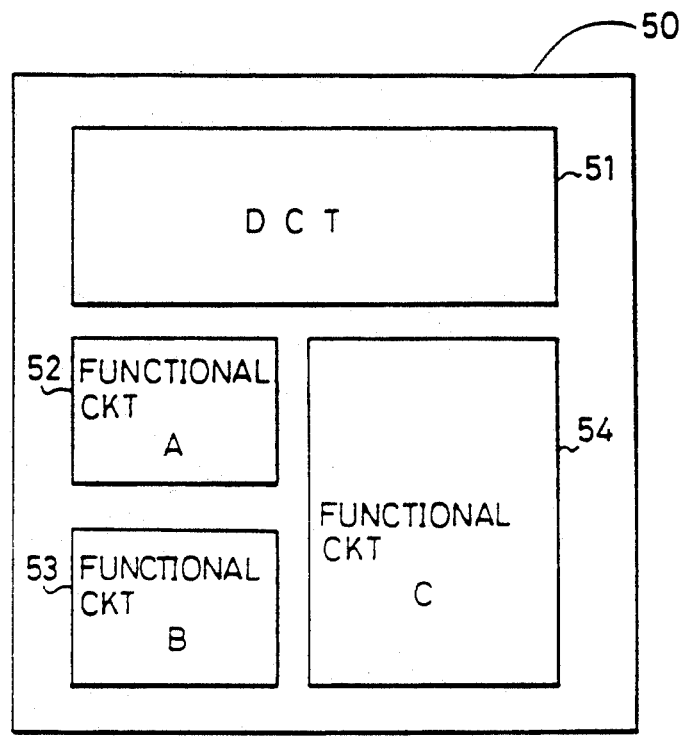
FIG. 16 is a diagram showing configuration of a semiconductor integrated circuit apparatus including the DCT processor of the present invention.

It is also possible to incorporate all of the above-described DCT/inverse DCT functions integrally on a semiconductor integrated circuit and simultaneously incorporate functional circuitry having functions other than the DCT/inverse DCT functions integrally on one semiconductor substrate. FIG. 16 shows an example of use of a DCT processor which is incorporated integrally on one semiconductor substrate simultaneously with other functional circuitry.

Referring to FIG. 16, a semiconductor integrated circuit (semiconductor chip) 50 includes a DCT processor 51 and functional circuits 52, 53 and 54.

Figure 17:
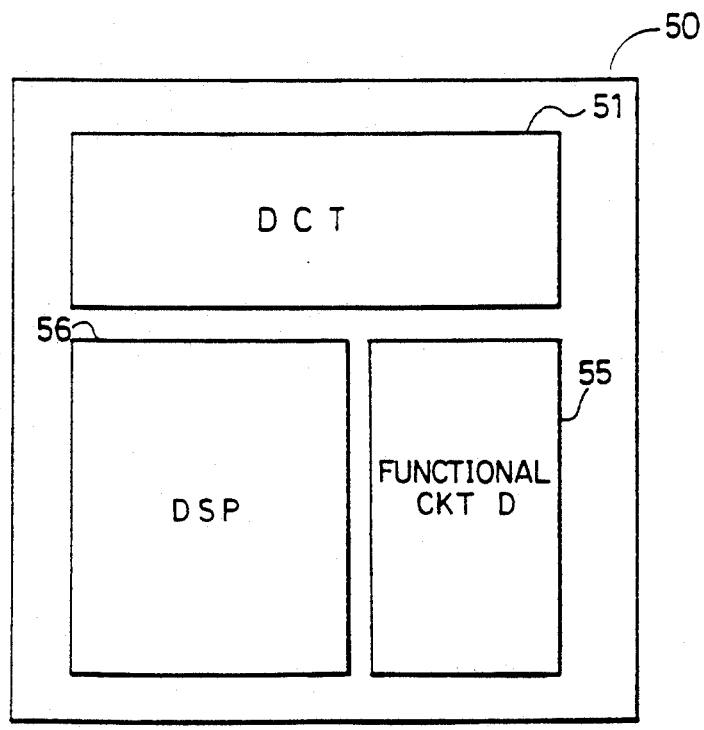
FIG. 17 is a diagram showing an example of modification of the semiconductor integrated circuit of FIG. 16.

DCT processor 51 has such configuration as shown in FIGS. 13 or 17. Functional circuits 52, 53 and 54 have different functions A, B and C, respectively. In application to video data processing, functions A, B and C include such functions necessary for image compression as quantization, variable length coding (entropy coding) and the like. The functions necessary for image compression are standardized by, for example, JPEG (Joint of Photographic Expert Group).

In the configuration shown in FIG. 16, DCT processor 51 is used in cooperation with (or in clock synchronization with) functional circuits 52, 53 and 54.

In the embodiment shown in FIG. 16, the functional circuits integrated together with the DCT processor are dedicated circuits having specific functions. The functional circuits are not limited to such dedicated circuits and may be integrated together with a microprocessor or a programmable functional block 56 such as a DSP (Digital Signal Processor) as shown in, for example, FIG. 17. Further, the DCT processor may be integrated together with a dedicated functional circuit 55 and programmable functional block 56 in combination as shown in FIG. 17.

The summary of principal technical effects of the present invention is as follows:

(i) Since the required number of times of multiplication is reduced by preprocessing in DCT processing or by postprocessing in IDCT processing, load on a product sum operation circuit is reduced.

(ii) Since a product sum operation is carried out by a memory and an adder, the scale of circuitry is substantively reduced.

(iii) Because of the above item (ii), a parallel multiplication circuit is unnecessary. Accordingly, when the entire processor performs a synchronizing operation, a higher operation speed on a worst delay path is easily achieved, facilitating a faster processing.

(iv) Since the effect of the above item (iii) facilitates an upgrading of a DCT (or IDCT) processor, this effect is greatly advantageous particularly in implementation of the present DCT (or IDCT) processor on a semiconductor integrated circuit, together with the effect of reducing the circuit scale.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processor having at least a function of carrying out one-dimensional discrete cosine transform of N-term input data X, wherein said N is a positive integer, said processor comprising:
preprocessing means for carrying out addition and subtraction for each of sets of predetermined two terms of said input data X to generate a first set of addition data and a second set of subtraction data; and
matrix product means for obtaining a first matrix product of said first set of data from said preprocessing means and a predetermined first coefficient matrix, and a second matrix product of said second set of data and a predetermined second coefficient matrix, to produce an N term output Y;
said matrix product means including
storage means for sequentially receiving said first set of data from said preprocessing means to store the received data, each of said first set of data having a plurality of bits,
parallel reading means for reading, in parallel and in order, one-bit data in the same bit figure of all of said first set of data stored in said storage means, and
means responsive to said parallel reading means for producing said first matrix product.

2. The process of claim 1, wherein
said preprocessing means includes:
set generating means for generating a set of pth term data X(p) and qth term data X(q) of said input data X, where $p+q=N-1$, $0 \leq p < q \leq N-1$, and p and q are an integer;
addition means for carrying out addition of 2-term data output from said set generating means; and
subtraction means for carrying out subtraction of the 2-term data output from said set generating means.

3. The processor of claim 1, wherein
said matrix product means further includes
a plurality of product sum operation means, and wherein each said product sum operation means includes
table memory means for receiving parallel bit data from said parallel reading means as an address signal to output a corresponding partial sum, said table memory means storing in advance a product sum of a corresponding coefficient and parallel bit data in a table form, and
accumulation means for accumulating outputs of said table memory means, said accumulation means output providing a first set of output data of said N-term output data.

4. The processor of claim 3, wherein
said accumulation means includes
addition means for receiving an output of said table memory means at its one input,
register means for temporarily storing an output of said addition means therein, and
shift means for shifting storage data in said register means by a bit to apply the shifted data to the other input of said addition means.

5. The processor of claim 1, further comprising:
a postprocessing section for receiving an output of said matrix product means to carry out addition and subtraction of predetermined 2-term data of the received N-term data and generate first and second sets of output data; and
control means for enabling one of said preprocessing section and said postprocessing section.

6. The processor of claim 5, wherein
said postprocessing section includes means for carrying out addition and subtraction of (2i)th-term data Y (2i) and (2i+1)th-term data Y (2i+1) of N-term output data Y of said matrix product means wherein said i is an integer of $0 \leq i \leq N/2-1$.

7. The processor of claim 6, wherein
the addition of said data Y (2i) and Y (2i+1) indicates (i)th-term output data Z (i), and the subtraction of said data Y (2i) and Y (2i+1) indicates (N−i−1)th-term output data Z (N−i−1).

8. The processor of claim 5, further comprising:
second postprocessing means having the same configuration as that of said postprocessing means, for receiving an output of said second matrix product means; and
second control means for enabling one of said second preprocessing means and said second postprocessing means.

9. The processor of claim 1, further comprising:
transposition means for sequentially receiving output data of said matrix product means to store the received data therein, transpose a matrix formed by the stored data and sequentially output N-term intermediate data;
second preprocessing means having the same configuration as that of said preprocessing means, for receiving an output of said transposition means to carry out addition and subtraction for each of predetermined 2-term sets of said N-term intermediate data; and
second matrix product means having the same configuration as that of said matrix product means, for performing a product operation of output data of said second preprocessing means and a predetermined second coefficient matrix, an output of said second matrix product means indicating data-subjected to two-dimensional DCT processing.

10. The processor of claim 9, further comprising:
second post processing means having the same configuration as that of said postprocessing means, for receiving an output of said second matrix product means; and
second control means for enabling one of said second preprocessing means and said second preprocessing means.

11. The processor of claim 1, wherein
said processor is incorporated integratedly in an integrated circuit with functional circuitry.

12. The processor of claim 1, wherein
said N is 8.

13. A processor having at least a function of carrying out one-dimensional inverse discrete cosine transform of N-term multibit input data Y, wherein said N is a positive integer, said processor comprising:
matrix product means for dividing said N-term multibit input data Y into a first set of input data and a second set of input data and carrying out a product operation of said first set of input data and a first coefficient matrix and a product operation of said second set of input data and a second coefficient matrix, to generate a first set of intermediate data Mi and a second set of intermediate data Ni, wherein said i is an integer of $0 \leq i \leq N/2-1$; and postprocessing means for carrying out addition and substraction of two intermediate data in a predetermined relationship in said first set of intermediate data and said second set of intermediate data from said matrix product means to generate first and second sets of output data Xi;

said matrix product means including
- storage means for sequentially receiving and storing said second set of data,
- first parallel reading means for reading, in parallel and in order, one-bit data in the same bit figure of all of said second set of data stored in said storage means, and
- means responsive to said first parallel reading means for producing said second set of intermediate data.

14. The processor of claim 13, wherein
said postprocessing means includes means for carrying out addition and subtraction of said first set of (i)th-term intermediate data Mi and said second set of (i)th-term intermediate data Ni; and
addition data (Mi+Ni) indicates (i)th-term data of N-term output data, and subtraction said (Mi−Ni) indicates (N−i−1)th-term of said N-term output data.

15. The processor of claim 13, wherein
each of said first and second set of intermediate data is represented by a plurality of bits, and
said matrix product means further includes
- second parallel reading means for reading, in parallel and in order, one-bit data in the same bit figure of all of said first set of data in said storage means,
- first product sum operation means for carrying out a product sum operation of parallel bits data from said second parallel reading means and a corresponding coefficient of said first coefficient matrix to generate said first set of output data Xi, and
- second product sum operation means for carrying out a product sum operation of parallel bits data from said first parallel reading means and a corresponding coefficient of said second coefficient matrix to generate said second set of output data Xi.

16. The processor of claim 15, wherein
said first and second product sum operation means include a plurality of operation circuits each related to one term of said output data, each said operation circuit means including
- table memory means for receiving parallel bit data as an address signal to output the result of the product sum operation with the corresponding coefficient, said table memory means storing in advance data indicating the result of the product sum operation in a table form, and
- accumulation means for accumulating outputs of said table memory means.

17. The processor of claim 16, wherein
said accumulation means includes
2-input addition means for receiving an output of said table memory means at its one input,
register means for temporarily storing an output of said addition means, and
shift means for shifting storage data in said register means by a bit to apply the shifted data to the other input of said addition means, a final output of said shift means indicating output data of an associated term.

18. The processor of claim 13, further comprising:
preprocessing means for carrying out addition and subtraction of a predetermined set of 2-term data Y (j), Y (N−j−1) of said N-term input data Y to generate a first set of addition data and a second set of subtraction data, said first set of said addition data and said second set of said subtraction data being applied as said first and second sets of input data to said matrix product means; and
control means for enabling one of said preprocessing means and said postprocessing means.

19. The processor of claim 13, further comprising:
transposition means for sequentially receiving N-term N output data from said postprocessing means to store the received data therein, then transpose the stored data and output the transposed data;
second matrix product means of the same configuration as that of said matrix product means, for receiving an output of said transposition means; and
second postprocessing means of the same configuration as that of said postprocessing means, for receiving an output of said matrix product means,
an output of said second postprocessing means indicating data subjected to two-dimensional IDCT processing of N by N points.

20. The processor of claim 13, wherein
said N is 8.

21. The processor of claim 13, wherein
said processor is incorporated integratedly in an integrated circuit so as to operate in cooperation with other functional circuitry.

22. In a processor including storage means for sequentially receiving and storing first and second sets of data, first parallel reading means for reading in parallel and in order, one-dimensional data in the same bit figure of all of said first set of data stored in said storage means, second parallel reading means for reading in parallel and in order, one-bit data in the same bit figure of all of said second set of data stored in said storage means, and a ROM, storing in advance data indicating the result of product sums of a corresponding coefficient and parallel bit data in a table form, for receiving parallel bit data from said first and second parallel reading means as address signals to output a corresponding partial sum, a method of processing one dimensional discrete cosine transform of N points on input data X, wherein N is $2^m$ with m being a natural number, comprising the steps of:
carrying out addition and substraction of each 2-term data in predetermined relationship in said input data X to generate a first set of addition data and a second set of substraction data, said first and second sets including N/2-term data;
accessing said ROM using said first set of N/2-term data as an address signal and outputting a corresponding partial sum as first output data;
accessing said ROM using said second set of N/2-term data as an address signal and outputting a corresponding partial sum as second output data; and
outputting said first and second sets of output data in a predetermined order.

23. The method of claim 22, wherein
said step of generating said first and second sets of output data includes the step of generating a corresponding partial sum by reference to a table memory, using an applied data as an address signal.

24. The method of claim 22, wherein
said 2-term data in said predetermined relationship are (i)th-term data x (i) and (N−i−1)th-term data x (N−i−1), wherein said i is an integer of $0 \leq i \leq N/2 - 1$.

25. In a processor including storage means for dividing N-term input data Y into a first set of even-term data Y (2i) and a second set of odd-term data Y (2i+1) and storing each of said first and second sets of data, wherein said i is an integer of $0 \leq 1 \leq N/2 - 1$, first reading means for reading in parallel one-bit data in the same order of said first set of all even-term data Y (2i), second reading means for reading in parallel one-bit data in the same order of said second set of all odd-term data Y (2i+1), and a ROM, storing in advance data indicating product sums of a corresponding coefficient and parallel bit data in a table form, for receiving parallel bit data as an address signal to output a corresponding partial sum, a method of carrying out one-dimensional inverse discrete cosine transform of N points, wherein N is $2^m$ with m being a natural number, comprising the steps of:

receiving N-term input data Y to generate said first set of even-term data Y (2i) and said second set of odd-term input data Y (2i+1);

accessing said ROM using said first set of even-term data Y (2i) as an address signal and outputting a corresponding partial sum as a first set of intermediate data M (i);

accessing said ROM using said second set of odd-term data Y (2i+1)) as an address signal and outputting a corresponding partial sum as a second set of intermediate data N (i);

carrying out addition and subtraction of said first set of intermediate data M (i) and said second set of intermediate data N (i) to generate a first set of addition data and a second set of subtraction data; and outputting said first set of addition data and said second set of subtraction data in a predetermined order.

26. The method of claim 25, wherein
said addition data is a sum of data M (i) and data N (i), said addition data of M (i)+N (i) indicating ith-term data X (i) of N-term output data; and
said subtraction data is a difference between data M (i) and data N (i), said subtraction data of M (i)−N (i) providing (N−i−1)th-term output data X (N−i−1).

27. The method of claim 25, wherein
said step of generating said intermediate data M (i) and N (i) includes the step of generating a corresponding partial sum by reference to a table memory, using the applied data as an address.

28. A processor having at least a function of carrying out one-dimensional discrete cosine transform of N-term input data X, wherein said N is a positive integer, said processor comprising:

preprocessing means for carrying out addition and substraction for each of sets of predetermined two terms of said input data X to generate a first set of addition data and a second set of subtraction data; and matrix product means for obtaining a first matrix product of said first set of data from said preprocessing means and a predetermined first coefficient matrix, and a second matrix product of said second set of data and a predetermined second coefficient matrix, to produce an N term output Y;

said matrix product means including
storage means for sequentially receiving said second set of data from said preprocessing means to store the received data, each of said second set of data having a plurality of bits,
parallel reading means for reading, in parallel and in order, one-bit data in the same bit figure of all of said second set of data stored in said storage means, and
means responsive to said parallel reading means for producing said second matrix product.

29. The processor of claim 28, wherein
said matrix product means further includes
a plurality of product sum operation means for generating a second set of said N-term output data, and wherein
each said product sum operation means includes
table memory means for receiving parallel bit data from said parallel reading means as an address signal to output a corresponding partial sum, said table memory means storing in advance a product sum of a corresponding coefficient and parallel bit data in a table form, and
accumulation means for accumulating outputs of said table memory means to generate a second set of data of said N-term output data.

30. The processor of claim 29, wherein
said accumulation means includes
addition means for receiving an output of said table memory means at its one input,
register means for temporarily storing an output of said addition means, and
shift means for shifting storage data in said register means by a bit to apply the shifted data to the other input of said addition means, a final output of said shift means providing said second set of data of said N-term output data.

31. The process of claim 28, wherein
said preprocessing means includes:
set generating means for generating a set of pth term data data X(p) and qth term data X(q) of said input data X, where $p+q=N-1$, $0 \leq p \leq q \leq N-1$, and p and q are an integer;
addition means for carrying out addition of 2-term data output from said set generating means; and
subtraction means for carrying out subtraction of the 2-term data output from said set generating means.

32. The process of claim 28, further comprising:
a postprocessing section for receiving an output of said matrix product means to carry out addition and subtraction of predetermined 2-term data of the received N-term data and generate first and second sets of output data; and
control means for enabling one of said preprocessing section and said postprocessing section.

33. The processing of claim 32, wherein
said postprocessing section includes means for carrying out addition and subtraction of (2i)th-term data Y (2i) and (2i+1)th-term data Y (2i+1) of N-term output data Y of said matrix product means wherein said i is an integer of $0 \leq i \leq N/2 - 1$.

34. The processor of claim 33, wherein
the addition of said data Y (2i) and Y (2i+1) indicates (i)th-term output data Z (i), and the subtraction of said data Y (2i) and Y (2i+1) indicates (N−i−1)th-term output data Z (N−i−1).

35. The processor of claim 32, further comprising:

second postprocessing means having the same configuration as that of said postprocessing means, for receiving an output of said second matrix product means; and second control means for enabling one of said second preprocessing means and said second postprocessing means.

36. The processor of claim 28, further comprising:

transposition means for sequentially receiving output data of said matrix product means to store the received data therein, transpose a matrix formed by the stored data and sequentially output N-term intermediate data;

second preprocessing means having the same configuration as that of said preprocessing means, for receiving an output of said transposition means to carry out addition and subtraction for each of predetermined 2-term sets of said N-term intermediate data; and second matrix product means having the same configuration as that of said matrix product means, for performing a product operation of output data of said second preprocessing means and a predetermined second coefficient matrix, an output of said second matrix product means indicating data subjected to two-dimensional DCT processing.

37. The processor of claim 36, further comprising:

second postprocessing means having the same configuration as that of said postprocessing means, for receiving an output of said second matrix product means; and second control means for enabling one of said second preprocessing means and said second preprocessing means.

38. The processor of claim 28, wherein said processor is incorporated integratedly in an integrated circuit with functional circuitry.

39. The processor of claim 28, wherein said N is 8.

40. A processor having at least a function of carrying out one-dimensional inverse discrete cosine transform of N-term multibit input data Y, wherein said N is a positive integer, said processor comprising:

matrix product means for dividing said N-term multibit input data Y into a first set of multibit input data and a second set of input data and carrying out a product operation of said first set of input data and a first coefficient matrix and a product operation of said second set of input data and a second coefficient matrix, to generate a first set of intermediate data Mi and a second set of intermediate data Ni, wherein said i is an integer of $0 \leq i \leq N/2 - 1$; and postprocessing means for carrying out addition and substraction of two intermediate data in a predetermined relationship in said first set of intermediate data and said second set of intermediate data from said matrix product means to generate first and second sets of output data Xi;

said matrix product means including storage means for sequentially receiving and storing said first set of multibit input data, first parallel reading means for reading, in parallel and in order, one-bit data in the same bit figure of all of said first set of data stored in said storage means, and means responsive to said first parallel reading means for producing said first set of intermediate data.

41. The processor of claim 40, wherein said postprocessing means includes means for carrying out addition and subtraction of said first set of (i)th-term intermediate data Mi and said second set of (i)th-term intermediate data Ni; and addition data (Mi+Ni) indicates (i)th-term data of N-term output data, and subtraction said (Mi−Ni) indicates (N−i−1)th-term of said N-term output data.

42. The processor of claim 40, wherein each of said first and second set of intermediate data is represented by a plurality of bits, and said matrix product means further includes second parallel reading means for reading, in parallel and in order, one-bit data in the same bit figure of all of said second set of data in said storage means, first product sum operation means for carrying out a product sum operation of parallel bits data from said first parallel reading means and a corresponding coefficient of said first coefficient matrix to generate said first set of output data Xi, and second product sum operation means for carrying out a product sum operation of parallel bits data from said second parallel reading means and a corresponding coefficient of said second coefficient matrix to generate said second set of output data Xi.

43. The processor of claim 42, wherein said first and second product sum operation means include a plurality of operation circuits each related to one term of said output data, each said operation circuit means including table memory means for receiving parallel bit data as an address signal to output the result of the product sum operation with the corresponding coefficient, said table memory means storing in advance data indicating the result of the product sum operation in a table form, and accumulation means for accumulating outputs of said table memory means.

44. The processor of claim 43, wherein said accumulation means includes 2-input addition means for receiving an output of said table memory means at its one input, register means for temporarily storing an output of said addition means, and shift means for shifting storage data in said register means by a bit to apply the shifted data to the other input of said addition means, a final output of said shift means indicating output data of an associated term.

45. The processor of claim 40, further comprising:

preprocessing means for carrying out addition and subtraction of a predetermined set of 2-term data Y (j), Y (N−j−1) of said N-term input data Y to generate a first set of addition data and a second set of subtraction data, said first set of said addition data and said second set of said subtraction data being applied as said first and second sets of input data to said matrix product means; and control means for enabling one of said preprocessing means and said postprocessing means.

46. The processor of claim 40, further comprising:

transposition means for sequentially receiving N-term N output data from said postprocessing means to store the received data therein, then transpose the stored data and output the transposed data;

second matrix product means of the same configuration as that of said matrix product means, for receiving an output of said transposition means; and second postprocessing means of the same configuration as that of said postprocessing means, for receiving an output of said matrix product means, an output of said second postprocessing means indicating data subjected to two-dimensional IDCT processing of N by N points.

47. The processor of claim 40, wherein said N is 8.

48. The processor of claim 40, wherein said processor is incorporated integratedly in an integrated circuit so as to operate in cooperation with other functional circuitry.

* * * * *